US012424738B2

(12) United States Patent
Suh et al.

(10) Patent No.: US 12,424,738 B2
(45) Date of Patent: Sep. 23, 2025

(54) ANTENNA UNITS, RADIATION AND BEAM SHAPE OF ANTENNA UNITS, AND METHODS THEREOF

(71) Applicant: Intel Corporation, Santa Clara, CA (US)

(72) Inventors: Seong-Youp John Suh, Portland, OR (US); Timo Sakari Huusari, Hillsboro, OR (US); Shuhei Yamada, Hillsboro, OR (US); Oner Orhan, San Jose, CA (US); Jose Rodrigo Camacho Perez, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 17/763,207

(22) PCT Filed: Dec. 24, 2019

(86) PCT No.: PCT/US2019/068464

§ 371 (c)(1),
(2) Date: Mar. 24, 2022

(87) PCT Pub. No.: WO2021/133388

PCT Pub. Date: Jul. 1, 2021

(65) Prior Publication Data

US 2022/0344835 A1 Oct. 27, 2022

(51) Int. Cl.
*H01Q 3/24* (2006.01)
*H01Q 1/52* (2006.01)
(Continued)

(52) U.S. Cl.
CPC ............. *H01Q 3/242* (2013.01); *H01Q 1/523* (2013.01); *H01Q 7/00* (2013.01); *H01Q 13/18* (2013.01);
(Continued)

(58) Field of Classification Search
CPC ...... H01Q 1/12; H01Q 1/1207; H01Q 1/1214; H01Q 1/1271; H01Q 1/286; H01Q 1/325;
(Continued)

(56) References Cited

U.S. PATENT DOCUMENTS

| | | | | |
|---|---|---|---|---|
| 6,356,235 B2 | 3/2002 | Laidig et al. | | |
| 2003/0189521 A1* | 10/2003 | Yamamoto | ........... | H01Q 9/0421 343/702 |

(Continued)

FOREIGN PATENT DOCUMENTS

| | | |
|---|---|---|
| CN | 105703083 A | 6/2016 |
| CN | 108281779 A | 7/2018 |
| JP | H11122027 A | 4/1999 |

OTHER PUBLICATIONS

Extended European search report issued for the corresponding European patent application No. EP19958016.8, dated Aug. 8, 2023, 9 pages (for informational purposes only).

(Continued)

*Primary Examiner* — Robert Karacsony
(74) *Attorney, Agent, or Firm* — Viering, Jentschura & Partner mbB

(57) ABSTRACT

Monodirectional antennas may be arranged to radiate in a near omni-directional pattern. By incorporating switches into the antenna arrangement, the antennas can be controlled to selectively radiate from a common radiofrequency feed. These arrangements may be packaged in a housing, which may aid both in antenna performance and in antenna installation. According to another aspect of the disclosure, housings may include a plurality of antennas, and one or more procedures may be implemented to determine a codebook to radiate from the circular arrangement according to various beam constrains.

13 Claims, 32 Drawing Sheets

(51) Int. Cl.

| | |
|---|---|
| ***H01Q 7/00*** | (2006.01) |
| ***H01Q 13/18*** | (2006.01) |
| ***H01Q 21/20*** | (2006.01) |
| ***H01Q 25/00*** | (2006.01) |
| *H01Q 1/12* | (2006.01) |
| *H01Q 1/32* | (2006.01) |

(52) U.S. Cl.
CPC ........... *H01Q 21/20* (2013.01); *H01Q 21/205* (2013.01); *H01Q 25/00* (2013.01); *H01Q 1/1271* (2013.01); *H01Q 1/325* (2013.01)

(58) Field of Classification Search
CPC .. H01Q 1/36; H01Q 1/38; H01Q 1/52; H01Q 1/523; H01Q 3/242; H01Q 7/00; H01Q 13/10; H01Q 13/103; H01Q 13/106; H01Q 13/16; H01Q 13/18; H01Q 21/0075; H01Q 21/0081; H01Q 21/061; H01Q 21/064; H01Q 21/20; H01Q 21/205; H01Q 21/29; H01Q 21/293; H01Q 21/296; H01Q 23/00; H01Q 25/00
See application file for complete search history.

(56) References Cited

U.S. PATENT DOCUMENTS

| | | | | |
|---|---|---|---|---|
| 2005/0219126 | A1* | 10/2005 | Rebeiz ................. | H01Q 25/008 343/700 MS |
| 2011/0080325 | A1 | 4/2011 | Livneh et al. | |
| 2014/0313080 | A1 | 10/2014 | Smith et al. | |
| 2015/0256213 | A1* | 9/2015 | Jan ....................... | H01Q 21/205 370/338 |
| 2016/0084935 | A1 | 3/2016 | Bellows et al. | |
| 2017/0110790 | A1 | 4/2017 | Kim | |

OTHER PUBLICATIONS

Kaneta et al., “A Flush-mounted Antenna for Mobile Communications”, IEEE APS International symposium, pp. 1323-1326, 1988.

Hong et al., “Low Profile Miniaturized Planar Antenna With Omnidirectional Vertically Polarized Radiation”, IEEE Transaction on Antennas and propagation, Jun. 2008, pp. 1533-1540, vol. 56.

International Search Report for International Application No. PCT/US2019/068464, mailed on Sep. 24, 2020, 3 pages (For reference purposes only).

* cited by examiner (a) Return loss (b) Azimuth radiation pattern (c) Elevation radiation pattern

ANTENNA UNITS, RADIATION AND BEAM SHAPE OF ANTENNA UNITS, AND METHODS THEREOF

CROSS-REFERENCE TO RELATED APPLICATIONS

This is a national phase application under 35 CFR 371 of PCT Application PCT/US2019/068464, which was filed on Dec. 24, 2019, the entire contents of which are incorporated herein by reference.

TECHNICAL FIELD

Various aspects of this disclosure generally relate to the use of directional antennas to approximate omni-directional radiation patterns, and the determination of beam-shape codebooks using constraint inputs.

BACKGROUND

Antennas are essential for wireless devices, including vehicles, routers, robots, road-side-unit, internet-of-things devices, infrastructural networks, small cell base-stations, and mobile devices, etc. Nevertheless, antenna performance is heavily impacted by antenna placement, form-factors of their surroundings, and interactions with metal and dielectric materials near the antennas. Customization of antenna designs for specific applications—and thus for the interactions with metal and dielectric materials near the antennas—increases Time-to-Market (TTM) and cost.

Moreover, antennas are typically placed on top of metal surfaces, which requires additional space for antenna installation and consideration of aerodynamic concerns, especially for high speed vehicles. Furthermore, aesthetic design may also play a particularly important role, perhaps especially for vehicles, robots, etc.

In certain antenna implementations, beam shaping may be of particular importance. It may be desirable to determine beam shaping settings (codebooks) with fewer processor resources.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
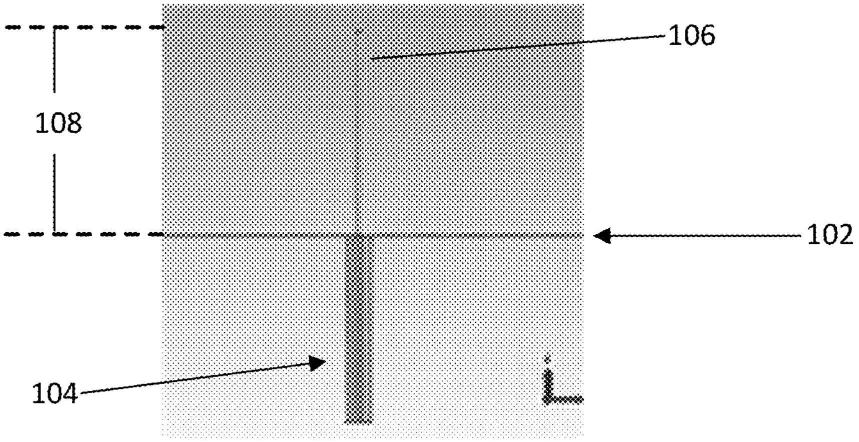
FIG. 1 depicts a conventional quarter-wavelength (λ/4) monopole antenna on top of a circular ground plane for omni-directional pattern projection.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and in the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. Any type of information, as described herein, may be handled for example via a one or more processors in a suitable way, e.g. as data.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, a computing system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The following description of an antenna unit addresses various problems and challenges, at least with respect to interactions with dielectric structures in a given application, according to a first aspect of the disclosure. Moreover, this disclosure includes procedures to reconfigure such an antenna from an original omni-directional pattern to a uni-directional pattern in a compact form factor, such as by using antenna-in-package (AIP) technology, which may integrate a front-end-module directly to the antenna. Such antennas may improve system performance by fostering low loss functionality, and thus an improved signal-to-noise ratio ("SNR"). Using these antennas, the TTM can be reduced and consistent antenna/radiofrequency ("RF") performance may be achieved for many applications and platforms with reduced cost.

This disclosure describes antennas offering a robust omni-directional antenna pattern, without respect to the materials on which the antenna is placed (whether metal, glass, plastic, composite materials, etc.). These antennas can be flush-mounted on the same level as the device surface, while still offering a robust omni-directional pattern. Moreover, these antennas can be reconfigured to yield either an omni-directional pattern or a directional pattern.

As described above, the antennas described herein may offer a robust omni-directional pattern, even when flush-mounted with any of a variety of materials (metals, plastics, composites, dielectrics, glasses, etc.). The antenna is a so-called "self-defined antenna," whose performance is maintained regardless of the surrounding environment. Therefore, the antenna performance may be consistent and robust, independently from other characters (materials, keep out zone, etc.) of the devices. These antennas may also change the direction of the pattern from omni-directional to directional, and vice versa, by implementing a simple switching topology. Moreover, an antenna and front-end-module can be integrated as a single package that enables low insertion loss and thus high SNR.

The antennas disclosed herein may be enclosed within a metal ground structure or cavity. Although slotted antennas can be placed on top of a cylindrical cavity and can provide robust performance in this configuration, they cannot, on their own, transmit in an omni-directional pattern, due to nature of the slotted cavity antenna with directional pattern. To solve this problem, multiple slotted antennas having directional patterns may be placed in a circular manner in or approximately in a common plane (i.e., along the horizontal direction (xy-plane)). The resulting structure can transmit in an omni-directional pattern. Moreover, a distributed feed network may be, for example, located from the top center of the cavity and connected to the slotted antennas at the edge of the cavity. This distributed feed network may allow the antennas to be excited simultaneously with the same amplitudes and phases, thereby achieving an omni-directional pattern by combining the directional patterns along 360 degrees in an xy-plane.

According to one aspect of the disclosure, it may be desired to institute impedance matching between the feed network and the slot antenna, so that broadband performance may be achieved. Slot antenna impedance may generally be intrinsically high (~507 ohms) with a center-fed configuration; however, due to the manufacturing capability, general transmission lines, such as co-planar waveguides and microstrip lines, are often designed at less than 100 ohms. An offset-feed slot antenna configuration may be introduced to resolve the discrepancy of the impedance between the feed network and slot antenna, which could offer suitable broadband impedance matching. In addition to the offset-feed configuration, capacitive coupling feed methodology may be added to neutralize the reactive component of the impedance, rather than direct contact to metal, since the impedance of the cavity-backed slot antenna is inductive. The feed network may be of significant importance to define the wide bandwidth of the antenna system.

According to another aspect of the disclosure, switches may be used along the distributed feed network, which may allow for individual antenna elements to be turned on or off, to reconfigure the radiation pattern from the omni-directional pattern to directional patterns and vice versa. Moreover, the RF front-end-module ("RFFE") may be integrated with the cavity-backed antenna. The RFFE may be integrated on a bottom side of the antenna cavity and may provide a feed transmission line through the center of the cavity.

According to an aspect of the disclosure, the antenna unit disclosed herein may be configured as an antenna-in-package. The antenna-in-package may be understood as a universal antenna, which may be appropriate for use a wide variety of implementations, including, but not limited to next generation WiFi, 5G/6G wireless network infrastructure, V2X, road-side-units, autonomous vehicles, robotics, IOT, laptops, drones, access points and small cell base stations, etc., each of which may require aesthetic, industrial designs while still maintaining high-standards of wireless performance. Although many currently-used antennas are custom-designed for specific applications and devices (due to the nature of antenna performance, variations with different materials and form factor of the devices are often taken into consideration in design), the principles and devices disclosed herein may largely obviate the need for such custom-designs and may therefore be thought of as a most universal approach to antenna design.

According to an aspect of the disclosure, the antennas disclosed herein may have a low vertical profile, compared to other known antennas used for similar purposes. Thus, the antennas disclosed herein may eliminate stubby, unsightly antennas from vehicles and may have significant impact on the industrial designs of future autonomous vehicles and IOT devices.

Moreover, the antennas disclosed herein may be configured to include an RFFE module that may be integrated with the antenna as a single package. In light of these various benefits, it is believed that the total cost of producing and utilizing the antennas disclosed herein may be significantly reduced compared to conventional models.

FIG. 1 depicts a conventional quarter-wavelength (λ/4) monopole antenna on top of a circular ground plane (diameter=40 mm) for omni-directional pattern projection at a frequency of 5.9 GHz. A ground plane 102 of the antenna may be generally perpendicular to the antenna body and may correspond to a surface on which the antenna is mounted (i.e. a vehicle rooftop, a metal surface, etc.). The antenna may be connected to a coaxial cable 104 to deliver the radio frequency signal to be transmitted. The antenna may include antenna body 106 having an antenna height 108, which may be determined based on the various needs of the implementation.

In general, the monopole antenna and its variations are well known as being capable of producing an omni-directional radiation pattern. The antenna shapes may be varied; however, it is very common to place the antenna element on top of a ground plane, such that the antenna extends above the ground plane to a given height to excite the antenna. The height may depend on the performance requirements for the specific antenna; however, it is generally understood that such monopole antennas must be above the ground plane.

Figure 2A:
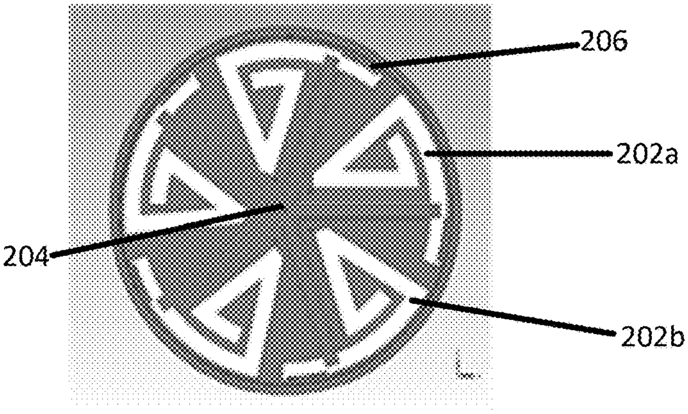
FIGS. 2A-2C depict various views of an antenna according to an aspect of the disclosure.
Figure 2B:
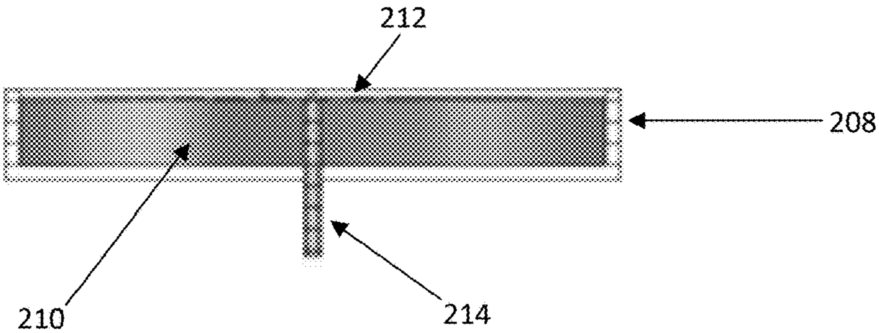
Figure 2C:
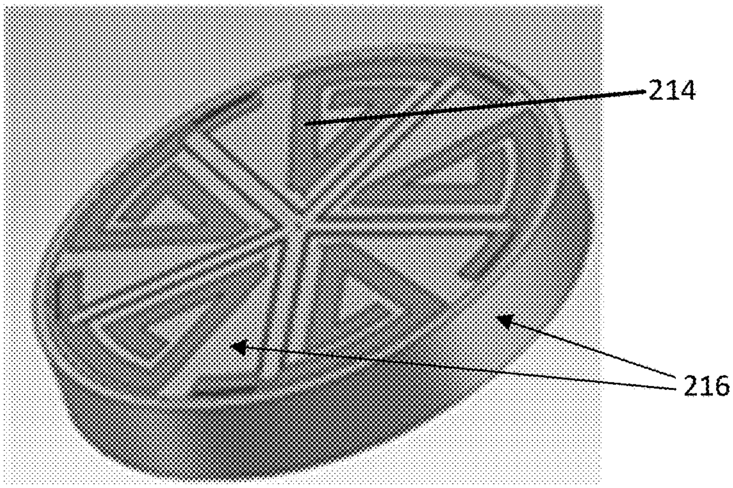

FIGS. 2A-2C depict various views of an antenna according to an aspect of the disclosure. FIG. 2A depicts a top view of an antenna according to an aspect of the disclosure. The antenna may include slotted antenna elements 202*a* and 202*b* (the remaining three slotted antenna elements in FIG. 2A are not labeled) on top of a metal cavity (not visible in this view), with a coaxial feed and a distributed feed network 204. The slotted antennas may be fed through co-planar waveguides using an offset-feed methodology for the sake of impedance matching.

Although the impedance of slot antennas with a center-fed configuration is intrinsically high (~507 ohm), the standard coaxial feed, co-planar waveguide, and microstrip lines are typically designed at 50 ohms. An offset-feed slot antenna configuration may be utilized to resolve the discrepancy of the impedance between the feed network and slot antenna, which may result in broadband impedance matching. In addition to the offset-feed configuration, a capacitive coupling feed 206 methodology may be added to neutralize the reactive component of the impedance, rather than relying on direct contact to the metal, since the impedance of the cavity-backed slot antenna is inductive. Each slotted antenna may have a sectoral directive pattern; however, the antennas' grouping may yield an omni-directional pattern when the individual slot antennas are combined together along the horizontal plane. Unlike the monopole antenna, the resulting antenna is planar, in a compact metal cavity form factor, but still offers a projection pattern comparable to an omni-directional pattern.

FIG. 2B depicts the antenna of FIG. 2A from a side view. In this view, the metal casing 208 which creates an inner cavity 210 may more clearly be seen. The antenna may be connected to the ground plane as depicted in 212. The antenna may be connected to a coaxial cable feed 214.

FIG. 2C depicts a three-dimensional view of the antenna of FIG. 2A, according to another aspect of the disclosure. In this configuration, the antennas may be printed on a printed circuit board 214. The resulting antennas may be housed in a metallized housing 216. That is, the printed circuit board may be metallized as required to create the housing structure disclosed herein.

According to one aspect of the disclosure, the antennas disclosed herein may be characterized by a robust omni-directional radiation pattern, even when the antenna is flush-mounted on a metal ground plane. Since the antenna may include a self-defined antenna enclosed with metallic cavity, the antenna may be flush-mounted on ground plane, thereby offering a number of practical and aesthetic effects.

Figure 3A:
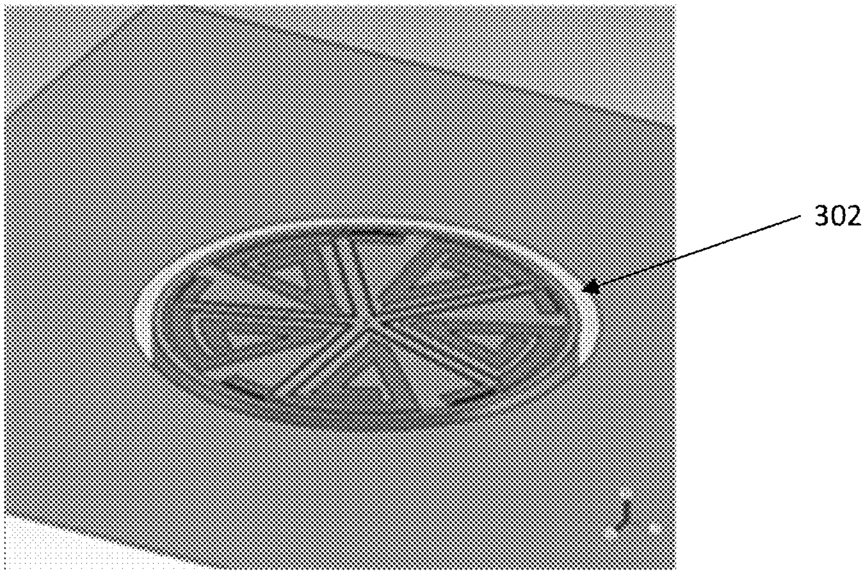
FIGS. 3A-3B show generally the antenna structure of FIG. 2A both with and without a gap between the antenna and the metal surface.
Figure 3B:
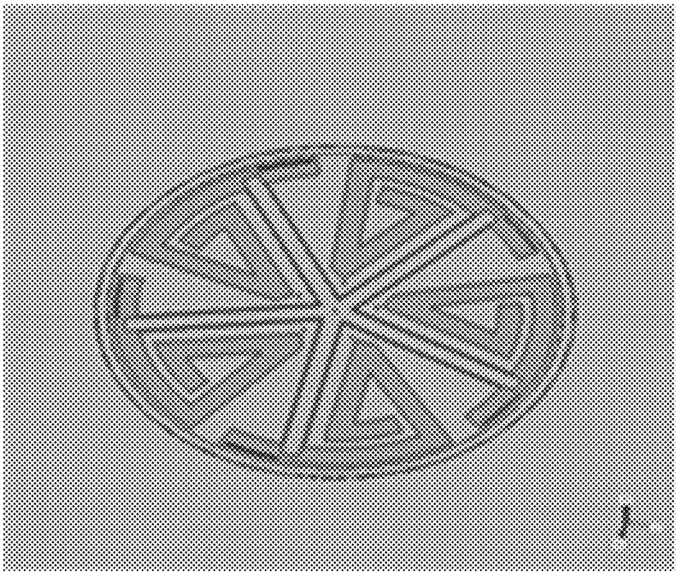

FIGS. 3A-3B show generally the antenna structure of FIG. 2A both with and without a gap between the antenna and the metal surface. Specifically, FIG. 3A depicts the antenna structure as disclosed herein mounted with a gap 302 (e.g., approximately 2 mm, or any other desired size) between the antenna unit and the surrounding surfaces. FIG. 3B, in contrast, depicts the same antenna unit configured without a gap between the antenna unit and the surrounding metal structure. That is, this antenna unit makes direct physical contact with the surrounding antenna structure.

In simulations of these antenna units, the antenna of FIG. 3A showed a radiation efficiency of 96% and a maximum gain of 3.4 dBi. The antenna of FIG. 3B showed a radiation efficiency of 98% and a maximum gain of 4.7 dBi. This indicates that robust performance can be achieved using these antennas even with direct contact to the surrounding materials.

The antennas disclosed herein may exhibit robust performance, even when the antennas are placed in close proximity to other materials such as metal, glass, dielectric materials, and composite materials, etc. This is due to the self-defined antenna features, which are not dependent on (not impaired by) the materials in a vicinity of where antennas are placed. For example, the antenna unit disclosed herein was modeled as being placed directly adjacent to a glass surface with a dielectric constant of 6.5 and conductivity of 0.032 S/m; the resulting radiation efficiency was simulated at 95% with maximum gain of 4.2 dBi. Similarly, the antenna unit disclosed herein was modeled as being placed directly adjacently to a Polytetrafluoroethylene surface with a dielectric constant of 2.1 and a loss tangent of 0.0002; the resulting radiation efficiency was simulated at 96% with a maximum gain of 2.5 dBi.

Figure 4A:
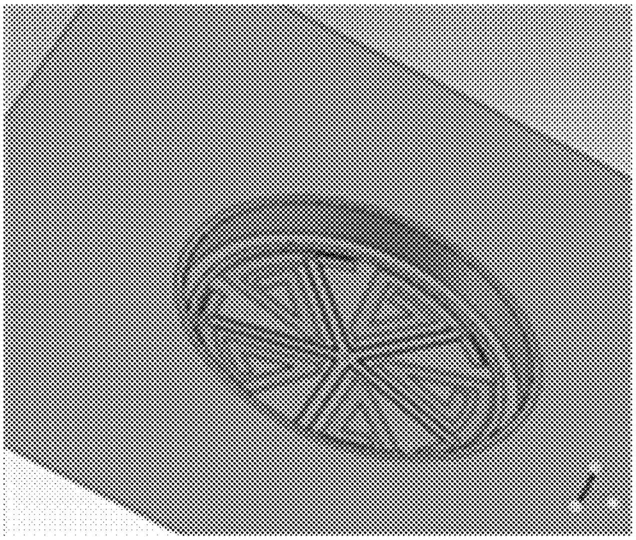
FIGS. 4A and 4B show a recessed antenna structure according to an aspect of the disclosure.
Figure 4B:
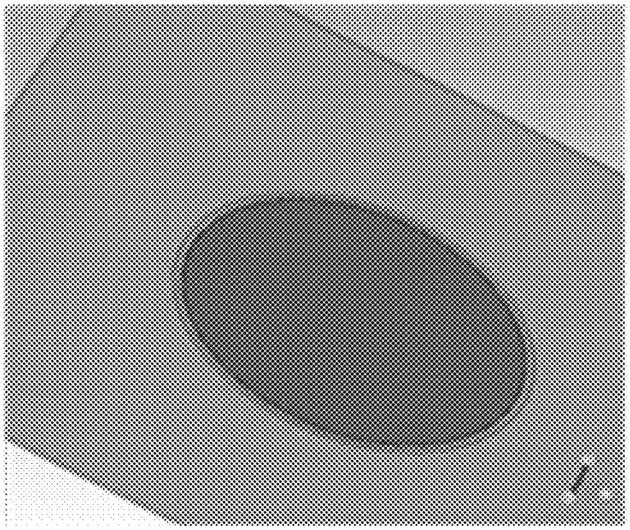

Due to various industrial design requirements and the realities of practical implementation within various devices for installation (e.g., autonomous vehicles, robots, routers, road side units and mobile devices, etc.), sometimes antenna may need to be completely concealed with a cover. Considering the thickness of the cover, the antenna may need to be placed at a negative height from the metal surface. That is, the antenna may be essentially recessed relative to its surrounding surface. Even with the negative height, simulations demonstrate that such antennas with plastic covers may still offer robust omni-directional patterns. FIGS. 4A and 4B show a recessed antenna structure according to an aspect of the disclosure. In FIG. 4A, an antenna unit as disclosed herein is depicted as being recessed relative to a surrounding surface (e.g. a surface of a vehicle, or otherwise). FIG. 4B depicts the antenna of FIG. 4A, covered by a Polytetrafluoroethylene cover, such that the resulting antenna unit cover is essentially flush with the surrounding surface. In this way, an omni-directional antenna may be built into an object (e.g. a vehicle or otherwise) such that the antenna is recessed and a covering of the antenna is flush with the remaining area, thereby hiding or obscuring the presence of an antenna. The antenna of FIG. 4B was modeled along with the antenna's cover, and in the simulation yielded a radiation efficiency of 97% and a maximum gain of 4 dBi.

Figure 5:
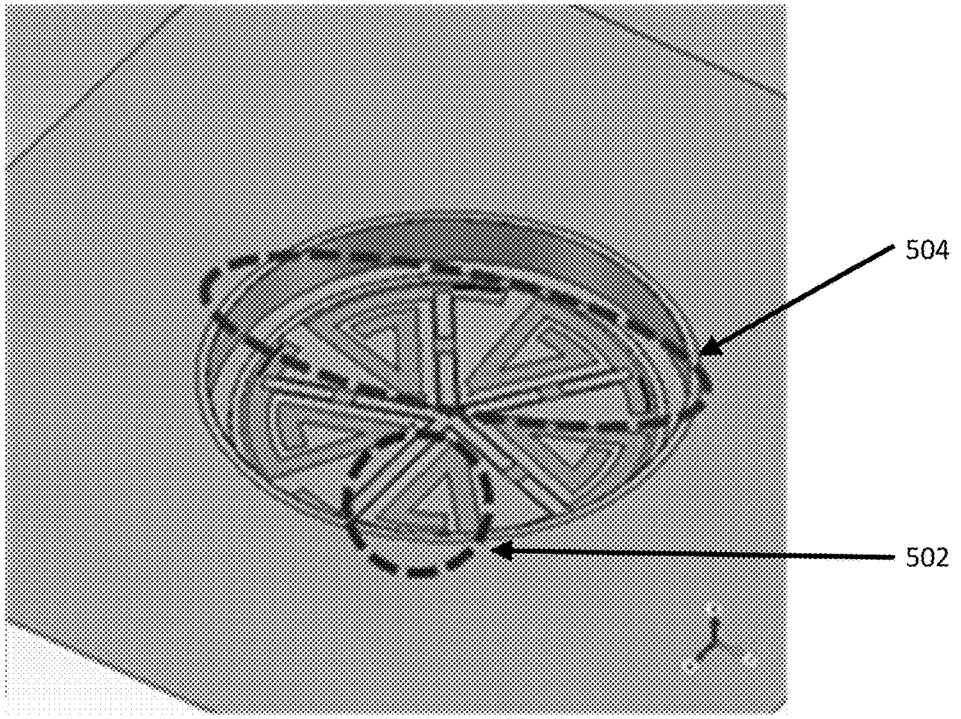
FIG. 5 depicts the recessed antenna of FIG. 4A, in which fewer than all antenna feeds are activated.

The proposed antenna unit may also change its beam direction from a horizontal plane (omni-directional pattern) to a vertical direction (uni-directional pattern). This may be achieved at least by controlling one or more switches to connect or disconnect one or more of the plurality of antennas to/from a radiofrequency feed. FIG. 5 depicts the recessed antenna of FIG. 4A, in which the feed for the antenna marked as 502 was left on, while the feeds for the remaining antennas 504 were turned off. Because only one antenna has an active feed, only that antenna becomes excited. This antenna becomes functionally a single slot antenna and projects in a conventional, directional manner. This configuration in which only antenna 502 was excited, was simulated and yielded a radiation efficiency of 93% and a maximum gain of 7 dBi. This procedure can be performed with any single antenna in the antenna unit, any two antennas, three antennas, and so on up to the n−1 antennas. n is the total number of antennas in the antenna unit. When n antennas are switched on, the resulting radiation pattern is expected to be omni-directional.

Figure 6:
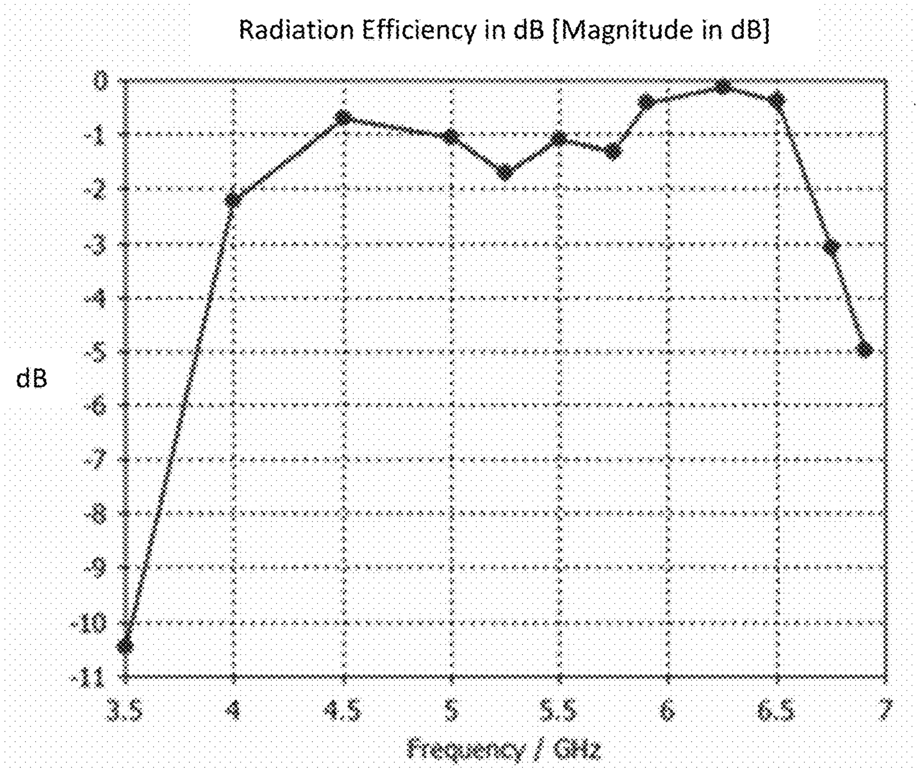
FIG. 6 depicts radiation efficiencies over broad bandwidth of the concealed antenna shown in FIG. 4B.

FIG. 6 depicts radiation efficiencies over broad bandwidth of the concealed antenna shown in FIG. 4B. In this graph, the horizontal axis depicts frequency, and the vertical axis depicts decibels. As can be seen, the simulation results of the radiation efficiencies demonstrate broadband radiation performance.

According to another aspect of the disclosure, the antennas may be designed at a frequency of 5.9 GHz. This frequency is provided for demonstrative purposes and is not intended to be limiting. The antenna may be configured at any frequency desired for the implementation, and any specific frequency reference thereto should not be understood as being limiting. Further testing of the variations of the return losses of the antenna with various conditions and environment of antenna with metals, glasses, plastics, and even with concealed form factor demonstrated robust and consistent impedance performance.

The antenna unit disclosed herein may be designed as an integrated antenna-in-package. Providing the antenna unit as an antenna-in-package may provide several effects, including, but not limited to: low noise figure, due to the LNA being close to antenna; low insertion loss from the PA to the antenna, thereby requiring less PA output power; more consistent performance and lower time to market, pre-designed front-ends; a small form factor; integrated control of beam-switching (pattern re-configurability); or any combination thereof.

An integrated front end may also permit the antenna, PA and LNA to be co-designed, thereby allowing for the optimization of impedance of the antenna & amplifiers for better performance (bandwidth, power, power consumption), given that a standard 50 Ohm performance might not be the optimal value to satisfy all requirements.

Figure 7A:
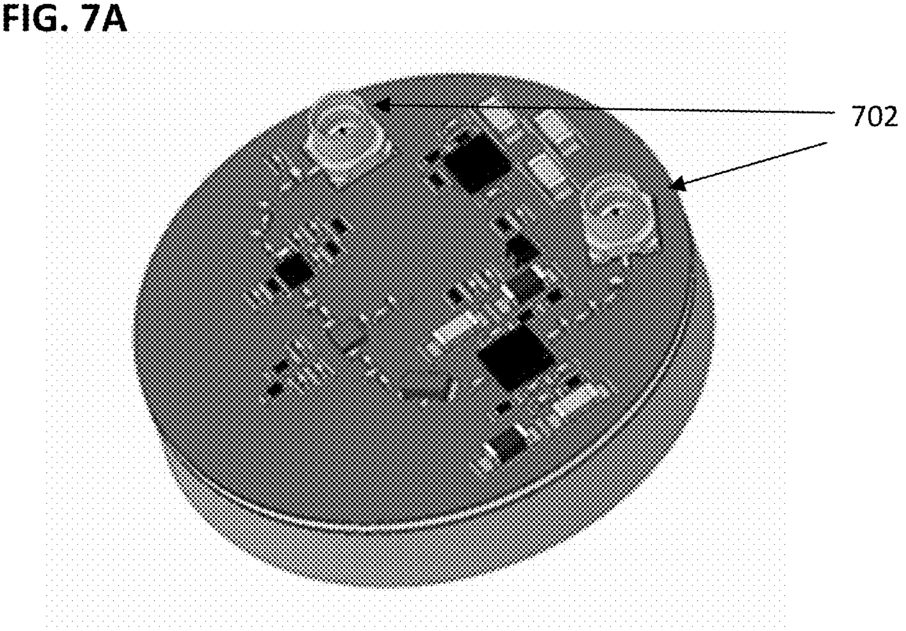
FIGS. 7A and 7B depict a rear view and a front view of an RFFE concept.
Figure 7B:
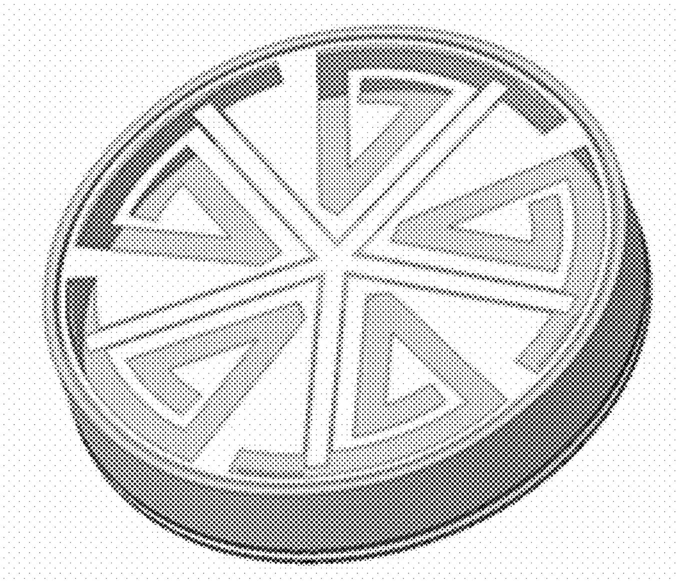

FIGS. 7A and 7B depict a rear view and a front view, respectively, of an RFFE concept, integrated with the antenna unit disclosed herein, thereby forming an antenna-in-package. This antenna may be optimized for any desired frequency. According to one aspect of the disclosure, the antenna may be optimized for 5.9 GHz, although this should be understood as being non-limiting. Although the size may be any desired size for an implementation, the diameter may be 40 mm, for example. According to an aspect of the disclosure, the connectors 702 may be sub-miniature push-on ("SMP") components.

The term antenna-in-package ("AIP") may describe a structure in which antenna elements are integrated within a package. This is very common, particularly in mmWave integrated circuits ("IC"), as the physical size of antennas makes them suitable for tight integration, even in IC level. Tight integration reduces losses between the antenna and the RFFE. Furthermore, such integration allows for the optimization of electronics for a given antenna, since the nature of that antenna in an AIP configuration is static. An AIP configuration may be very appealing to a user, as the challenge of optimizing the antenna performance and integration into system has already been achieved, thereby offering significant simplicity.

PCBs of up to 0.25" thickness (6.35 mm) may readily be fabricated. This permits the possibility of replacing the metallic cavity with a PCB and creating the cavity either using vias or edge castellation.

Figure 8:
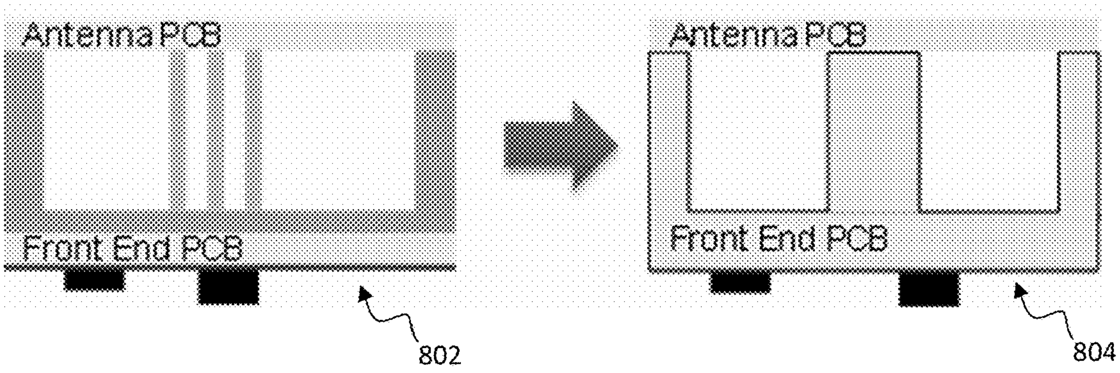
FIG. 8 depicts an AIP including the antenna unit according to two aspects of the disclosure.

Alternatively or additionally, the micro-coaxial cables (which impart a significant cost to antenna system design) may be replaced by vertical transmission lines. Together, the assembly process of the AIP may permit attachment of two different circuit boards. FIG. 8 depicts an AIP including the antenna unit disclosed herein 802 according to an aspect of the disclosure and AIP including the antenna unit disclosed herein 804 according to another aspect of the disclosure. The AIP in 804 utilizes thick PCB to obviate the need for a metal cavity and to eliminate the use of micro-coaxial cables.

Figure 9:
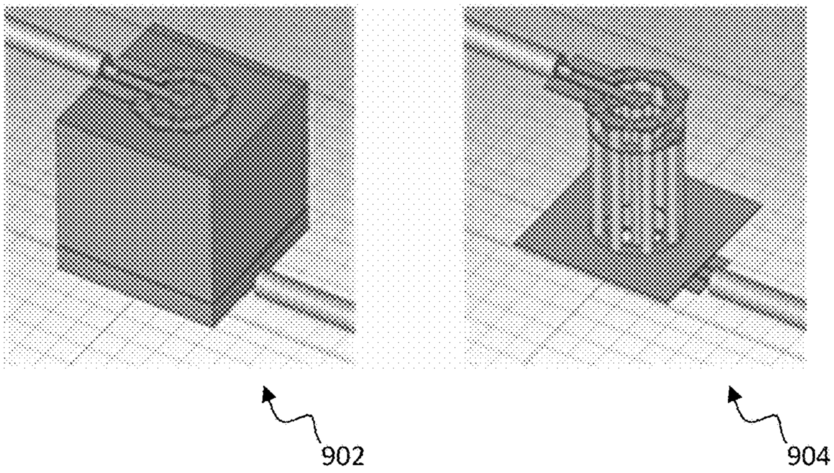
FIG. 9 depicts a sample vertical transmission lines optimization structure.
Figure 10:
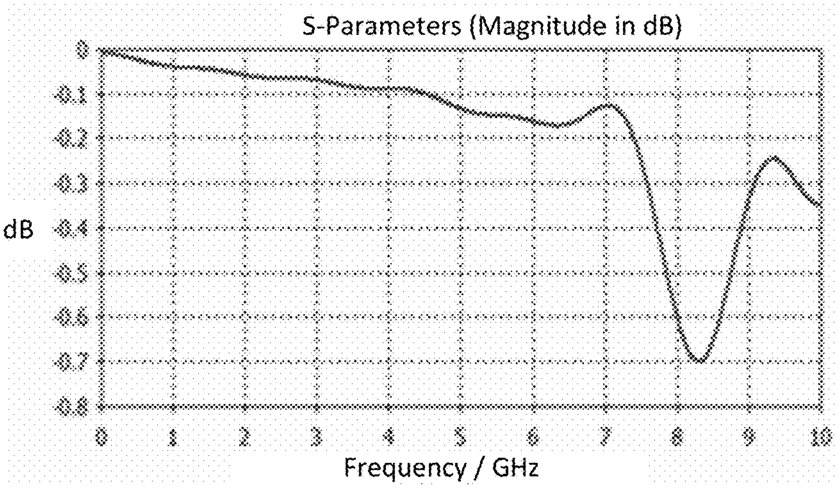
FIG. 10 depicts a simulation of the resulting AIP.

Although vertical transmission lines using thick PCBs are possible, such vertical transmission lines generally require careful optimization to avoid unintentional radiation. A sample vertical transmission line optimization structure is shown in FIG. 9. This figure depicts an AIP with PCB dielectric material 902. In 904, the AIP of 902 is shown, without the dielectric material being depicted, such that the metal structure is revealed. FIG. 10 depicts a simulation of the resulting AIP, indicating that insertion loss is typical for a lossy transmission line up to 7 GHz, after which the structure begins to radiate energy. The PCB block as depicted in 902 and 904 may be in a dimension desired for a given implementation. According to one aspect of the disclosure, and with being limiting, the PCB block may be 6 mm along an x-axis, 6 mm along a y-axis, and 5.08 mm along a z-axis.

In addition, the AIP may permit the implementation of smart antenna features such as beam switching, due to the comparatively simple integration of control electronics. Beam switching may allow the antenna to direct energy more toward the direction of single element. Although beam switching may sometimes be less effective than beamforming, beam switching is much simpler than beamforming and can generally be performed in a smaller space than would be required for the components necessary for beamforming.

According to an aspect of the disclosure, RF-switches may be used to switch between exciting all elements (i.e., such as when if 360° coverage is desired) and exciting fewer than all elements (i.e., such as when more directional covered is desired). The number of elements to be excited may be any number of elements from one element to all elements. Otherwise stated, the number of elements to be excited for non-omni-directional radiation may be expressed as $0<x\leq n-1$, wherein n=the total number of antennas. The number of elements to be excited for omni-directional radiation is generally n.

As the antennas require an air-filled cavity, it may be desirable to reduce the number of cables in the antenna housing, whenever it is possible. According to one aspect of the disclosure, this may be achieved through the use of light as a control mechanism. Reliance on light as a control mechanism may permit the inner cavity portion of the antenna housing to be devoid (or mostly devoid) of cables, which may foster improved performance of the antenna unit disclosed herein. In one implementation, the light control mechanism may include one or more light emitting elements (e.g., LEDs or otherwise) and one or more phototransistors. Additionally or alternatively, coaxial cables or vertical PCB lines may be used to carry DC-power to switches.

Figure 11:
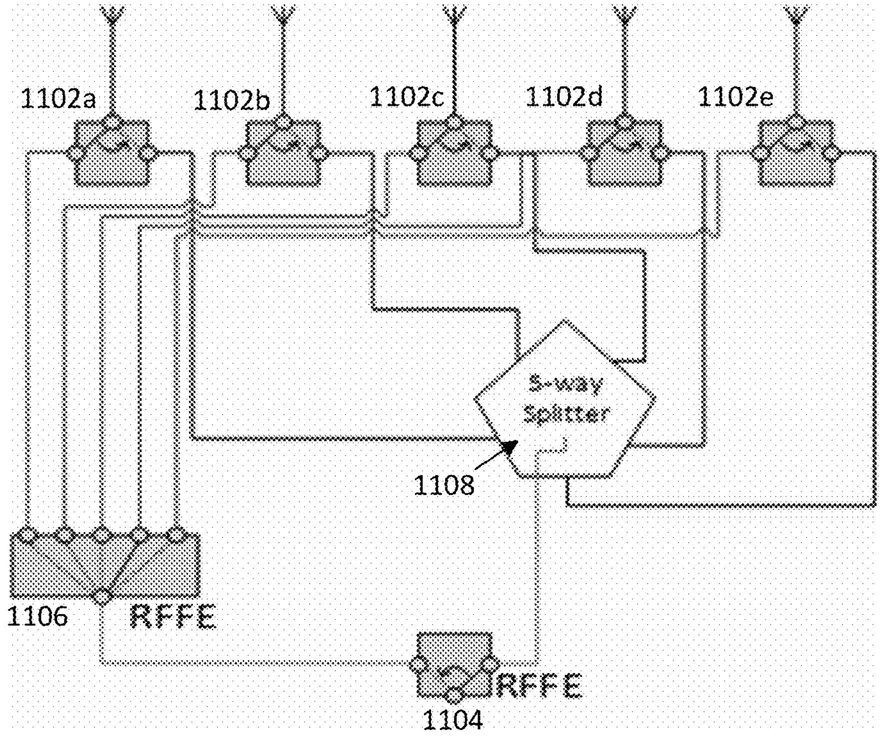
FIG. 11 depicts a block diagram of a switched-beam-concept.

FIG. 11 depicts a block diagram of a switched-beam-concept, according to an aspect of the disclosure. In this figure, the antenna unit may include a plurality of antennas 1102*a*-1102*e* which may optionally include a switch to select the input of the antenna, whether from a splitter or an antenna selection switch. The RFFE may include a first switch 1104, which may be configured to switch between an antenna selection switch 1106 or a splitter 1108. The splitter may be configured to split a signal for each of the antennas in the antenna unit. That is, since five antenna 1102*a*-1102*e* are depicted in the antenna array, a five way splitter 1108 is depicted herein. The splitter may be selected according to the desired number of antennas. When the first switch 1104 is switched to the 5-way splitter, a substantially identical signal is transmitted to each of the plurality of antennas. When the splitter 1108 is engaged, the antennas for excitement can be selected by controlling the switches at each antenna to select or deselect the input from the splitter. Alternatively or additionally, the first switch 1104 may be switched toward the antenna-selection switch. Depending on the switch configuration, one or more antennas may be selected by the antenna-selection switch, such that the one or more selected antennas of the plurality of antennas receive the signal. In this manner, the projection pattern of the antenna unit may be determined. Switches 1104 and/or 1106 may, if desired, be placed on the RFFE board.

Figure 12:
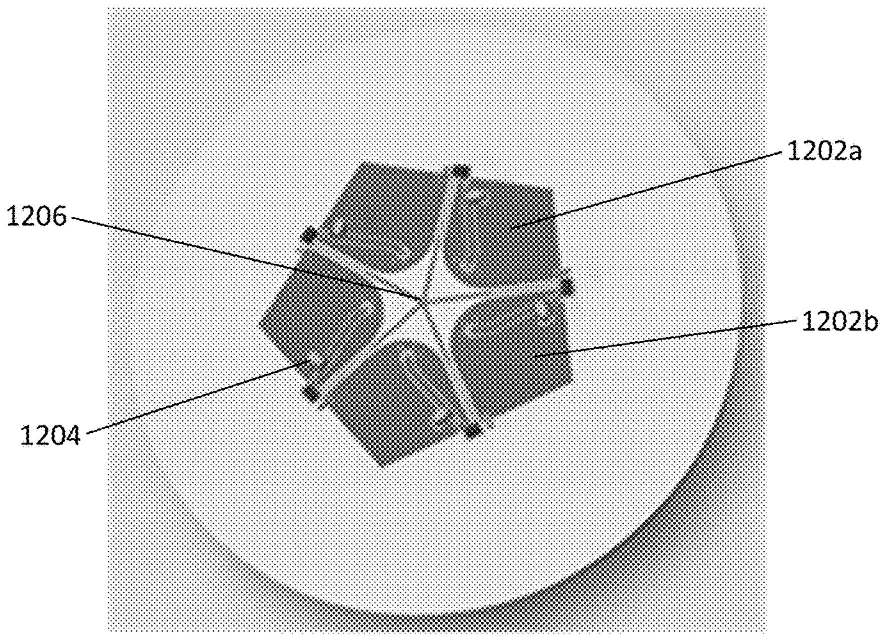
FIG. 12 depicts an implementation of a switched beam concept according to an aspect of the disclosure.

FIG. 12 depicts an implementation of a switched beam concept according to an aspect of the disclosure. This sample antenna unit includes five antennas, although the number in reality may be greater or fewer. 1202*a*, 1202*b* (remaining antennas not labeled), five switches 1204, and a five-way power splitter 1206.

Figure 13:
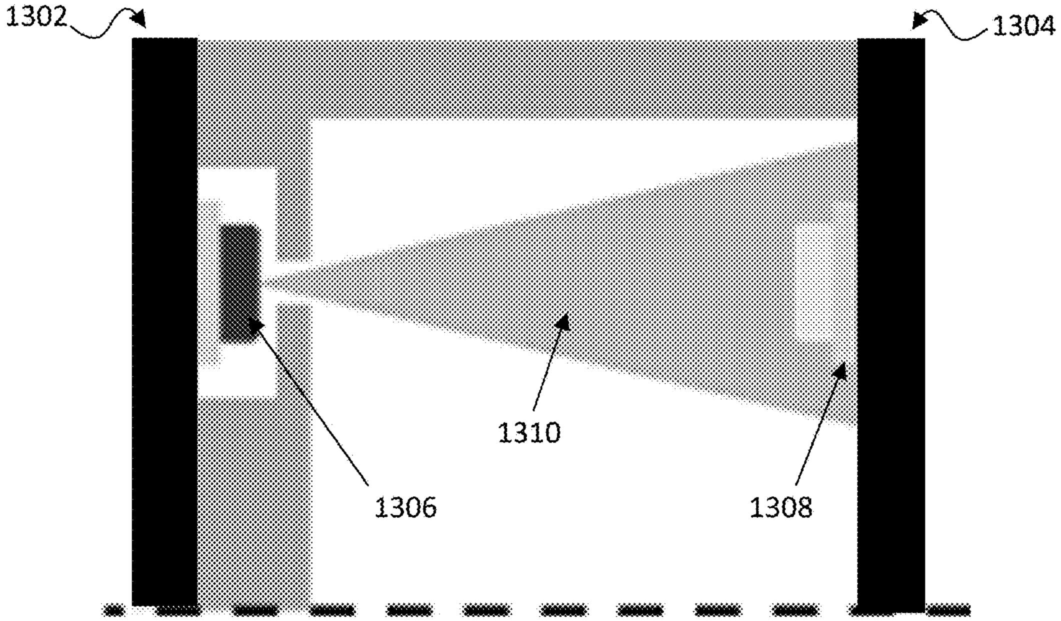
FIG. 13 depicts a light-switching mechanism for the antenna unit, according to an aspect of the disclosure.

FIG. 13 depicts a light-switching mechanism for the antenna unit, according to an aspect of the disclosure. In this figure, the RFFE 1302 and the antenna front end 304 have a line of sight connection to one another. The RFFE 1302 includes an LED 1306 or other light-emitting source. The antenna front end 1304 includes a phototransistor 1308. The light source 1306 outputs light in a desired wavelength 1310, selected to selectively switch on or off the phototransistor 1308. When the light 1310 shines on the phototransistor 1308, the phototransistor 1308 may enter a first state. When the light 1310 does not shine on the phototransistor 1308, the phototransistor 1308 may enter a second state. The phototransistor 1308 may be configured such that the first state and the second state correspond to a mode in which the corresponding antenna transmits and a mode in which the corresponding antenna does not transmit, respectively. Naturally, the opposite is also possible, wherein the absence of light 1310 causes the phototransistor 1308 to enter the first date and the presence of light 1310 causes the phototransistor 1308 to enter the second state.

Figure 14:
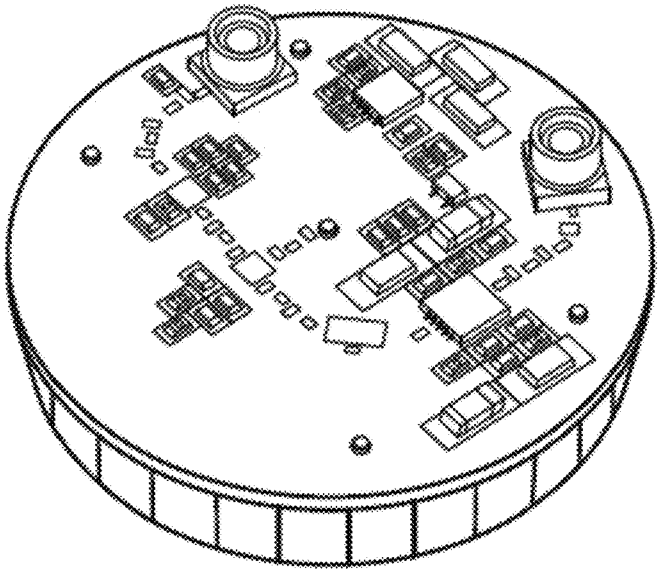
FIG. 14 depicts a sample illustration of a Front-End PCB with corresponding components.

FIG. 14 depicts a sample illustration of a Front-End PCB with corresponding components.

Figure 15:
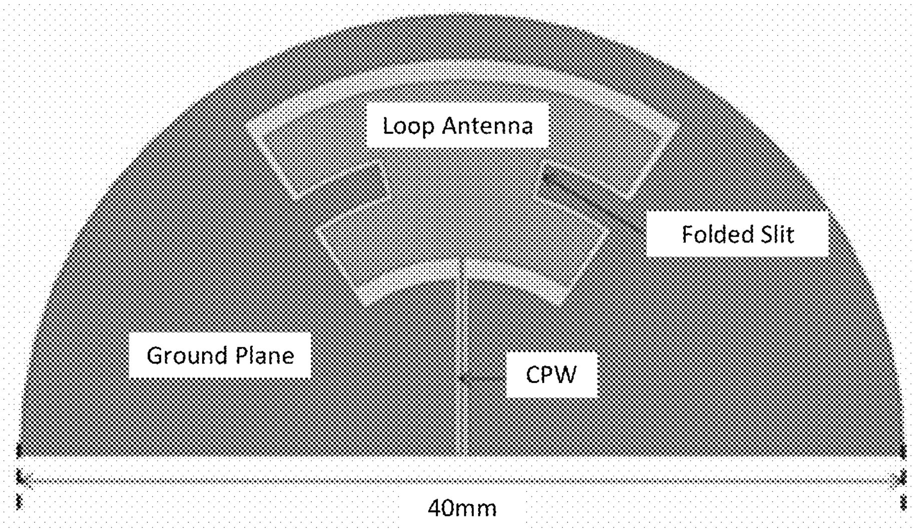
FIG. 15 depicts a modified antenna element.
Figure 16A:
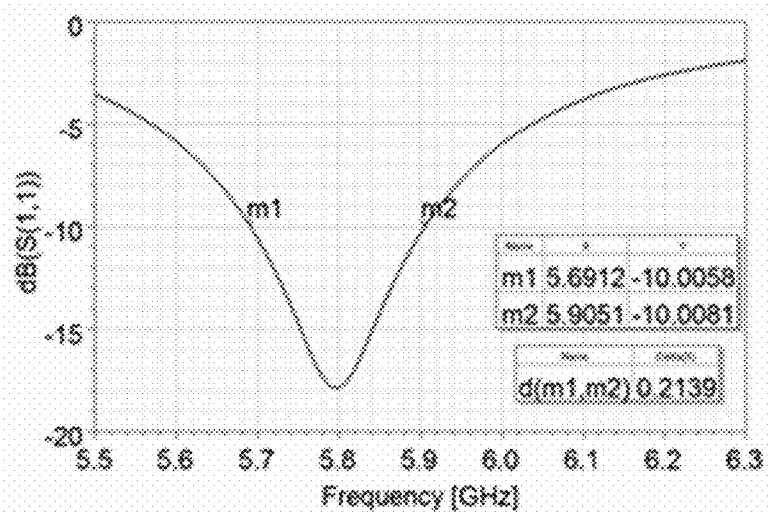
FIGS. 16A and 16B depicts simulation result of the antenna element of FIG. 15.
Figure 16B:
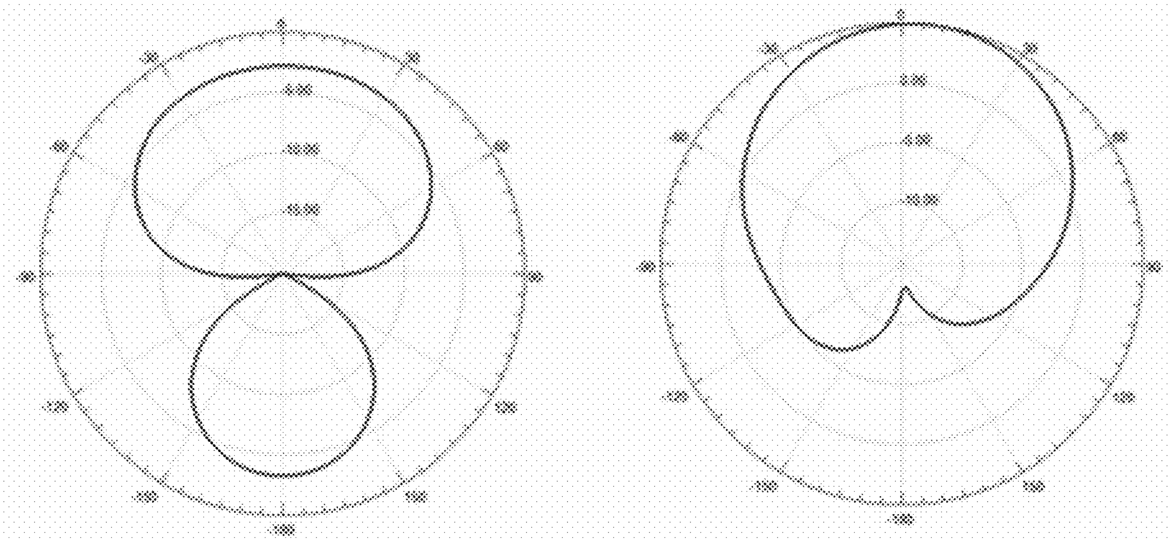

In order to improve the antenna bandwidth performance and permit size reduction, the antenna element may be modified as depicted in FIG. 15. This antenna may be, for example, a folded strip loop antenna with a co-planar waveguide (CPW) line feed architecture. The simulation results of this antenna element are shown in FIGS. 16A and 16B. These results show that the return loss exhibits >200 MHz of bandwidth. Note that the further size reduction is possible by adjusting the folded slit structure of the antenna. As it is believed that a person skilled in the art will understand the adjustment of the folded slit structure, this will not be discussed in further detail.

Figure 17:
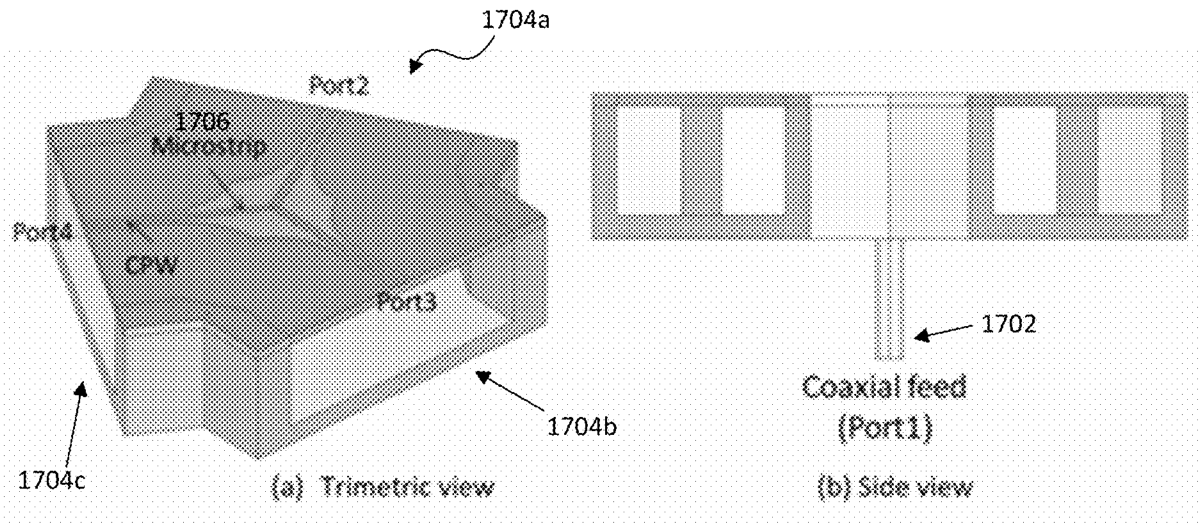
FIG. 17 depicts a corporate feed element for exciting multiple antenna elements.

FIG. 17 depicts a corporate feed element for exciting multiple antenna elements. For reduced size, the feed network may include a power splitter (3-way or otherwise) with an optional impedance transformer network and an optional microstrip-to-CPW transmission line transition. In greater detail, FIG. 17 depicts a corporate feed 3-element antenna array, according to an aspect of the disclosure. The antenna array is configured to receive a signal from a coaxial feed 1702. The antenna array may include multiple antenna ports, depicted as 1704*a*-1704*c*. In this depiction, three antenna ports are shown; however, the number of antenna ports may be configured for the given implementation and may be greater or fewer than three, without limitation. The antennas may be connected to the coaxial feed via one or more microstrips 1706.

Figure 18:
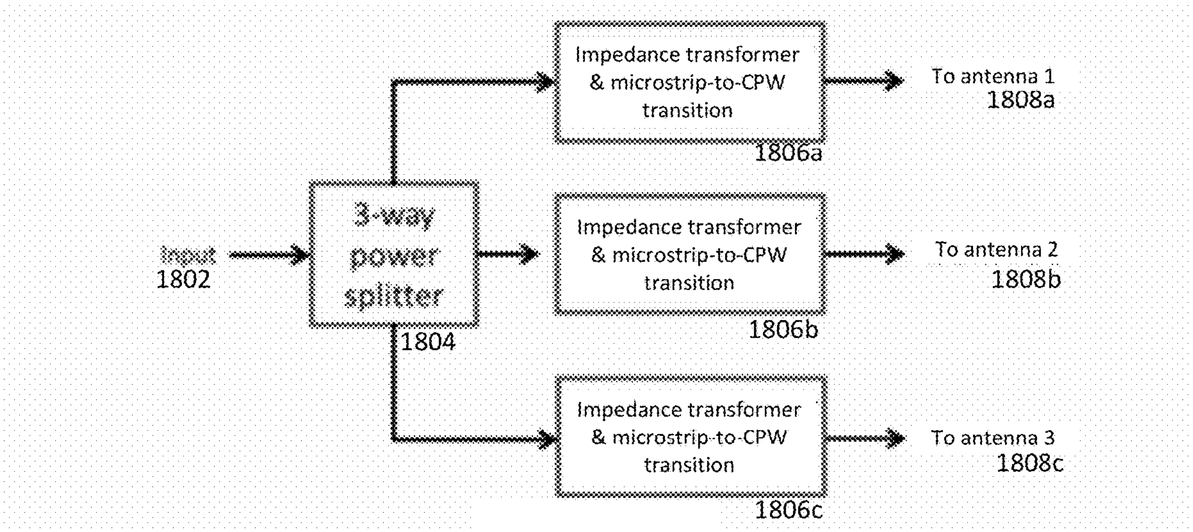
FIG. 18 depicts a functional representation of the power splitter and microstrips, according to an aspect of the disclosure.

FIG. 18 depicts a functional representation of the power splitter and microstrips, according to an aspect of the disclosure. In this figure, an input 1802 is fed via a coaxial cable into a power splitter 1804. The power splitter 1804 is depicted herein as a three-way power splitter; however, the power splitter can be five-way, seven-way, or include any other number of divisions desired for a given implementation. The output of the three-way power splitter 1804 is transferred along a corresponding number of impedance transformers and/or microstrips 1806*a*-1806*c*. Each of the impedance transformers and/or microstrips 1806*a*-1806*c* may conduct the power splitter 1804 output to the corresponding antennas 1808*a*-1808*c*.

Figure 19A:
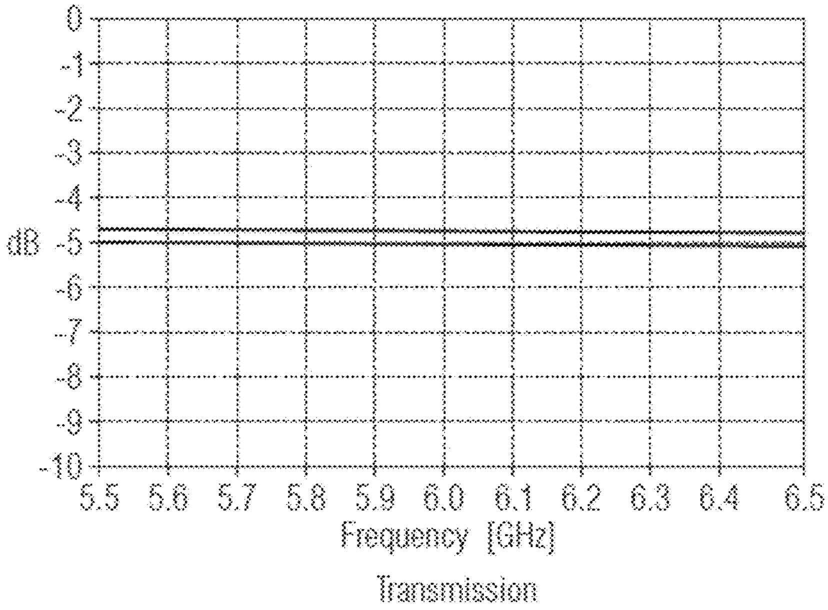
FIGS. 19A and 19B depict simulation results of the antenna and feed element depicted in FIGS. 17 and 18.
Figure 19B:
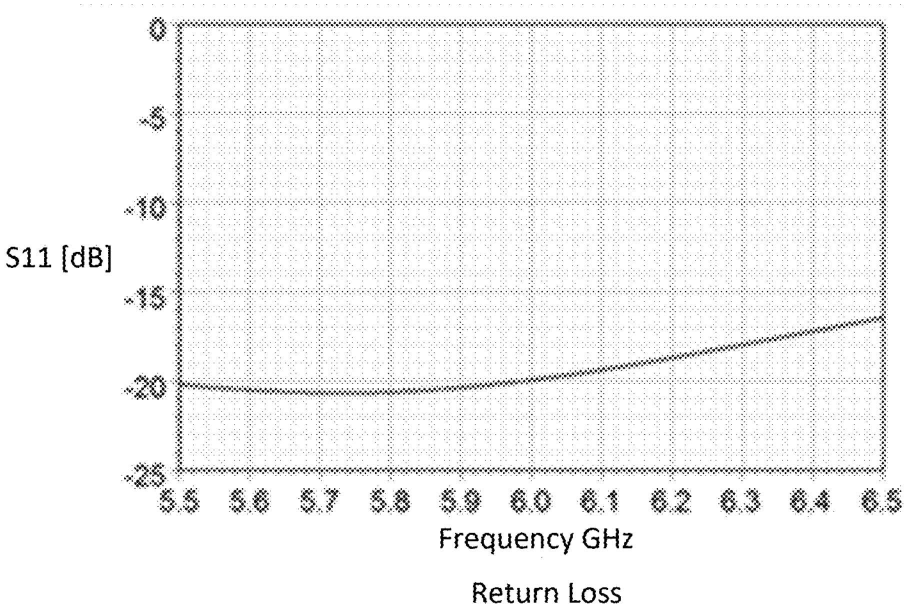

FIGS. 19A and 19B depict simulation results of the antenna and feed element depicted in FIGS. 17 and 18. These results show less than 5 dB of insertion loss over the entire frequency band of interest.

Figure 20A:
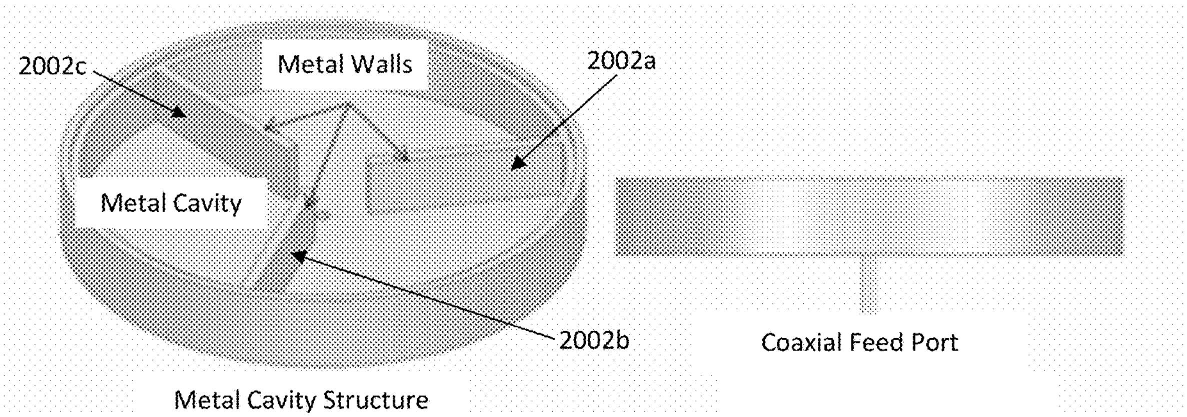
FIGS. 20A and 20B depict an antenna unit with three such metal walls in its cavity structure.
Figure 20B:
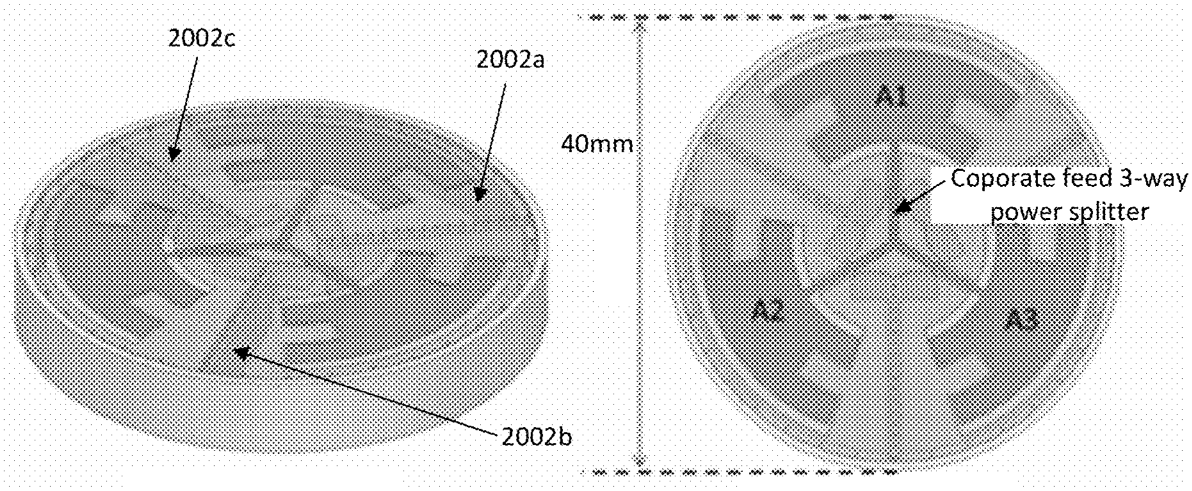

According to another aspect of the disclosure, metal walls may be created in the cavity structure to suppress the mutual coupling effect that causes the bandwidth degradation. FIGS. 20A and 20B depict an antenna unit with three such metal walls in its cavity structure, according to an aspect of the disclosure. Specifically, FIG. 20A depicts the antenna cavity structure including three metal walls 2002*a*, 2002*b*, and 2002*c*. The addition of these metal walls may improve resulting bandwidth by creating shielding structures to separate the antennas from one another. The presence of the metal walls may inhibit or preclude the antennas from mutually coupling with one another. Because this mutual coupling is associated with bandwidth degradation, the presence of the walls may result in improved bandwidth of the structure. FIG. 20 depicts a 3D and top view of the resulting antenna structure with side walls. In this figure, the sidewalls are again labeled as 2002*a*, 2002*b*, and 2002*c*.

Figure 21:
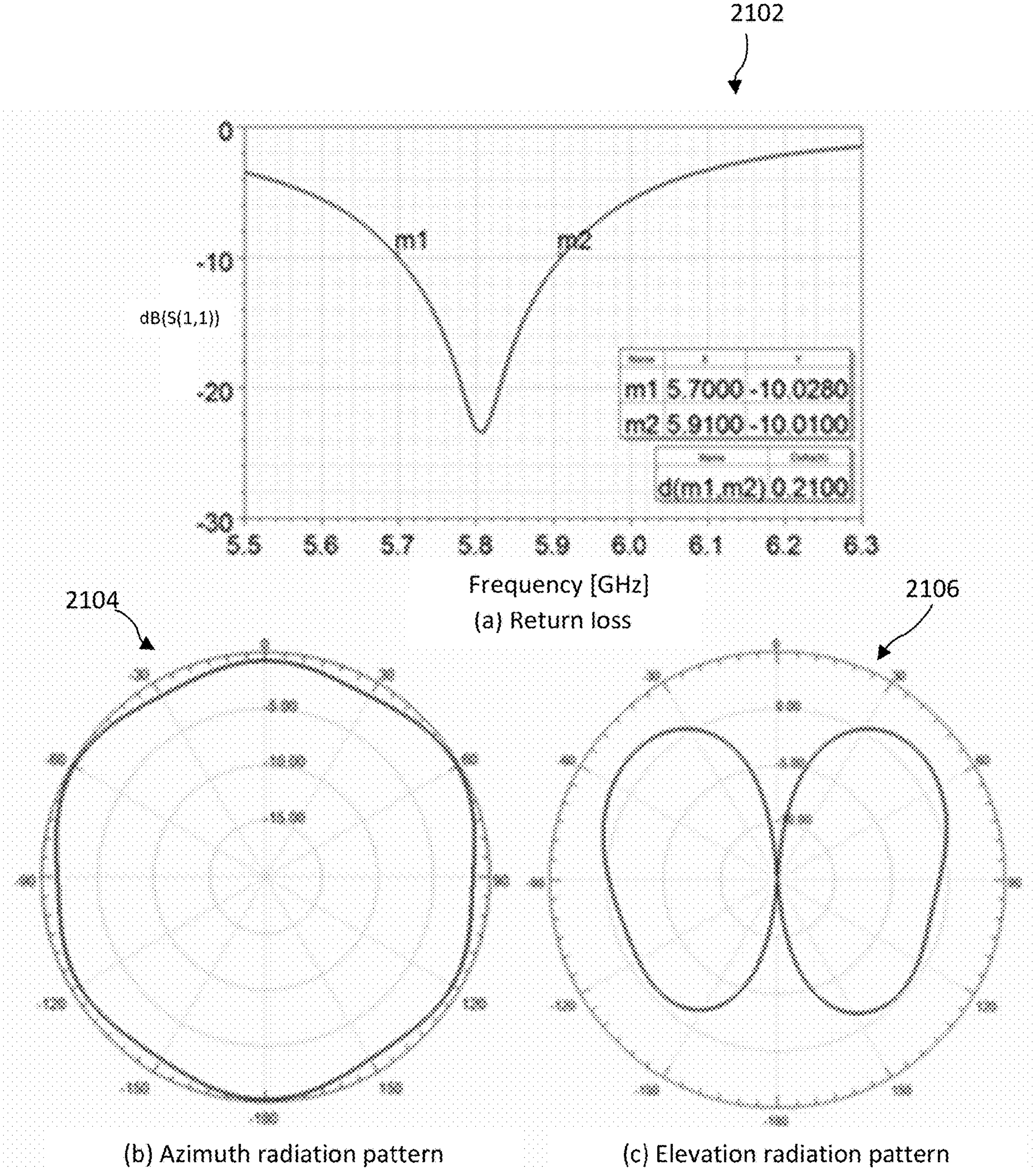
FIG. 21 depicts various simulation results of the configuration of FIGS. 20A and 20B.

FIG. 21 depicts various simulation results of the configuration of FIGS. 20A and 20B. These simulation results exhibit >200 MHz of bandwidth as depicted in 2102, as well as a quasi-omni-directional radiation pattern in azimuth direction, as depicted in 2104 and 2106.

Figure 22A:
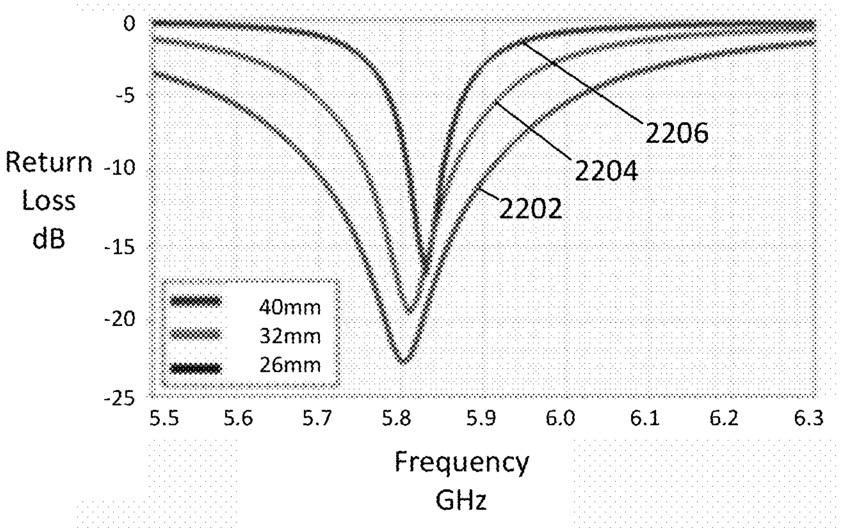
FIGS. 22A and 22B depict return loss and radiation efficiency of each of the three antenna unit sizes.
Figure 22B:
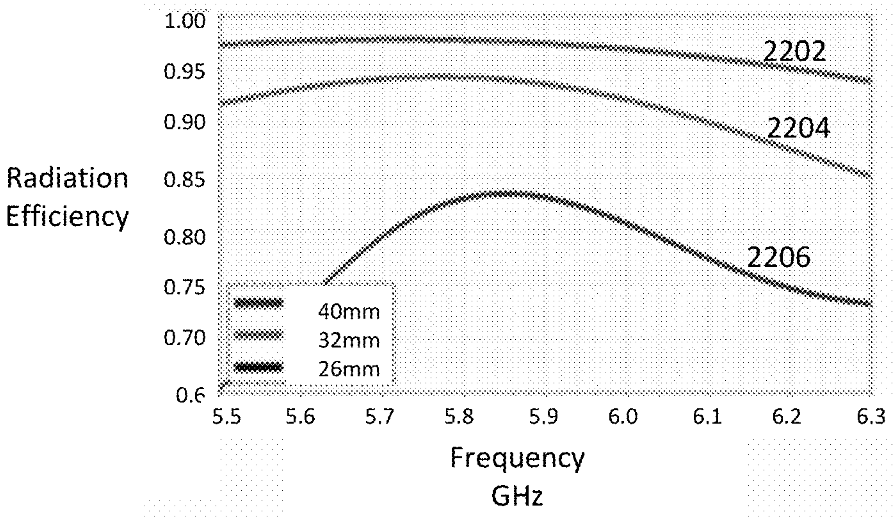

Depending on the implementation, it may be desirable to utilize an antenna unit as disclosed herein with a reduced size. Given that simulations included herein have assumed a circular antenna unit structure with a 40 mm diameter, it was desired to simulate antenna performance with a comparable antenna unit structure in smaller-sizes. Specifically, in this case, antenna unit structures of 32 mm and 26 mm were simulated. FIG. 22A shows the return loss of each of the three antenna unit sizes (40 mm 2202, 32 mm 2204, and 25 mm 2206). FIG. 22B shows the radiation efficiency of each of the three antenna unit sizes (40 mm 2202, 32 mm 2204, and 25 mm 2206). These figures show that both bandwidth and efficiency are degraded along with reduction in size, since a reduction in size necessitates that distance between the antennas is also reduced, which results in increasing the mutual coupling and thus degrades the overall performance.

Figure 23A:
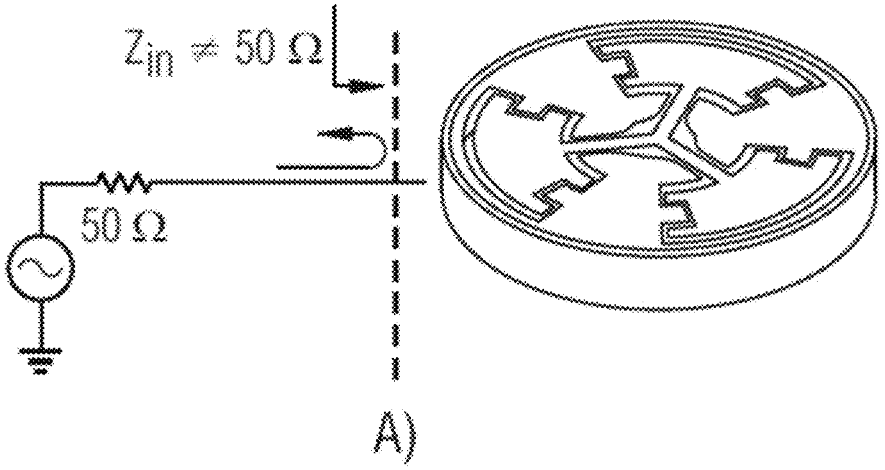
FIGS. 23A and 23B depict an impedance mismatch and an impedance matching circuit.
Figure 23B:
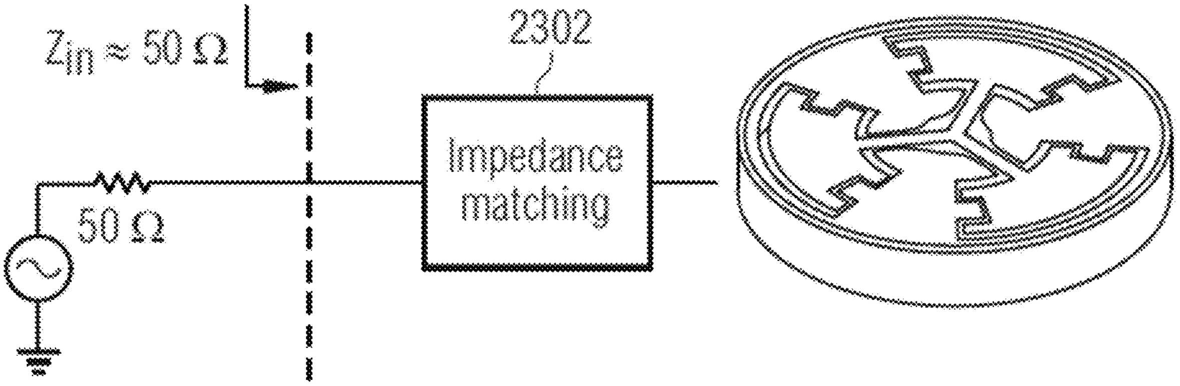

This reduction in bandwidth is largely due to impedance mismatch. When impedance mismatch occurs, incident power is reflected back to the source. This is because the antenna impedance differs from system impedance, which is typically son. One method of improving this impedance mismatch is to add an impedance matching network that transforms the antenna impedance to 50Ω, thereby increasing bandwidth. The impedance matching network is typically implemented via lumped elements (e.g., capacitors and inductors) at lower frequencies, and by using transmission line components at higher frequencies. FIG. 23A depicts an impedance mismatch causing power to reflect back reducing bandwidth. In this case, it can be seen that an impedance mismatch is present, which causes power to be reflected back into the system (as illustrated by the curved arrow). FIG. 23B depicts an additional impedance matching circuit 2302, which may be configured to create roughly equal impedances between the system and the antenna. The impedance matching circuit 2302 may include capacitors and/or inductors, and may be configured according to any known method of impedance matching. The impedance matching network may render the interface impedance 50Ω, thereby increasing bandwidth illustrates the function of matching network.

According to an aspect of the disclosure, the flush-mounted antennas may fall between low frequencies and high frequencies. In an evaluation of impedance matching in which ideal components with infinite resolution were used, it was demonstrated that a four-element matching network can increase bandwidth by 100%. However, using realistic component models, the same results could not be achieved, as the comparatively coarse availability of physical components were inadequate, i.e. changes of capacitance and inductance values were too much between available components.

Figure 24:
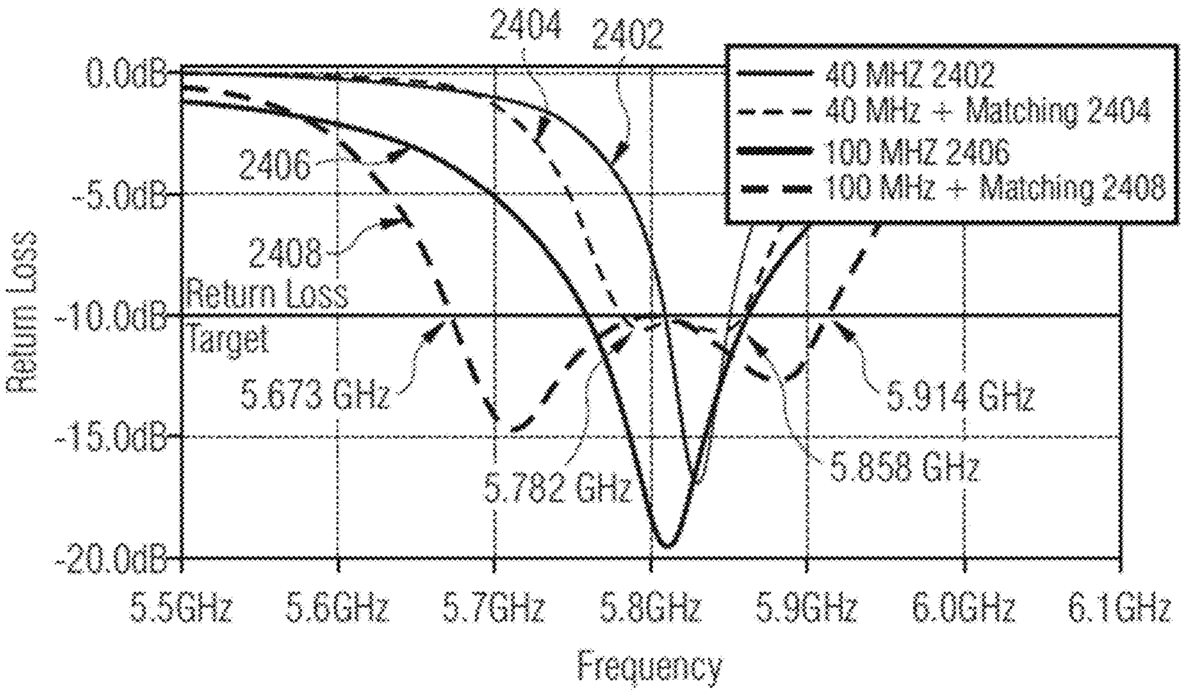
FIG. 24 depicts return loss of various configurations.

Transmission line stubs are typically sized at 6 GHz frequencies. Using a hybrid matching network consisting of lumped elements and transmission line components, the bandwidth can be increased by 85% to 125%, depending on the original antenna size (and bandwidth). FIG. 24 depicts the original and impedance matched bandwidths of 32 mm and 26 mm diameter antennas, according to an aspect of the disclosure. In FIG. 24, the return loss with a 40 MHz line is depicted at 2402; the return loss with a 40 MHz line with an additional matching component is depicted at 2404; the return loss with a 100 MHz line is depicted at 2406; and the return loss with a 100 MHz line with additional matching component is depicted at 2408.

Simulation results show realistic and physically implementable matching network possibilities. From this analysis, it can be seen that the bandwidth can be roughly doubled with an impedance matching network, which then permits the reduction of the antenna size. Furthermore, smaller electrical size enhances beamforming performance, and reduction of bandwidth can be thus compensated for using impedance matching.

Because the antenna unit disclosed herein may be implemented in a vehicle, it is desired to consider the effects of various vehicle placement scenarios on the performance of said antenna unit. This section summarizes an analysis of the performance of the antennas described herein in various vehicle placement scenarios.

Figure 25:
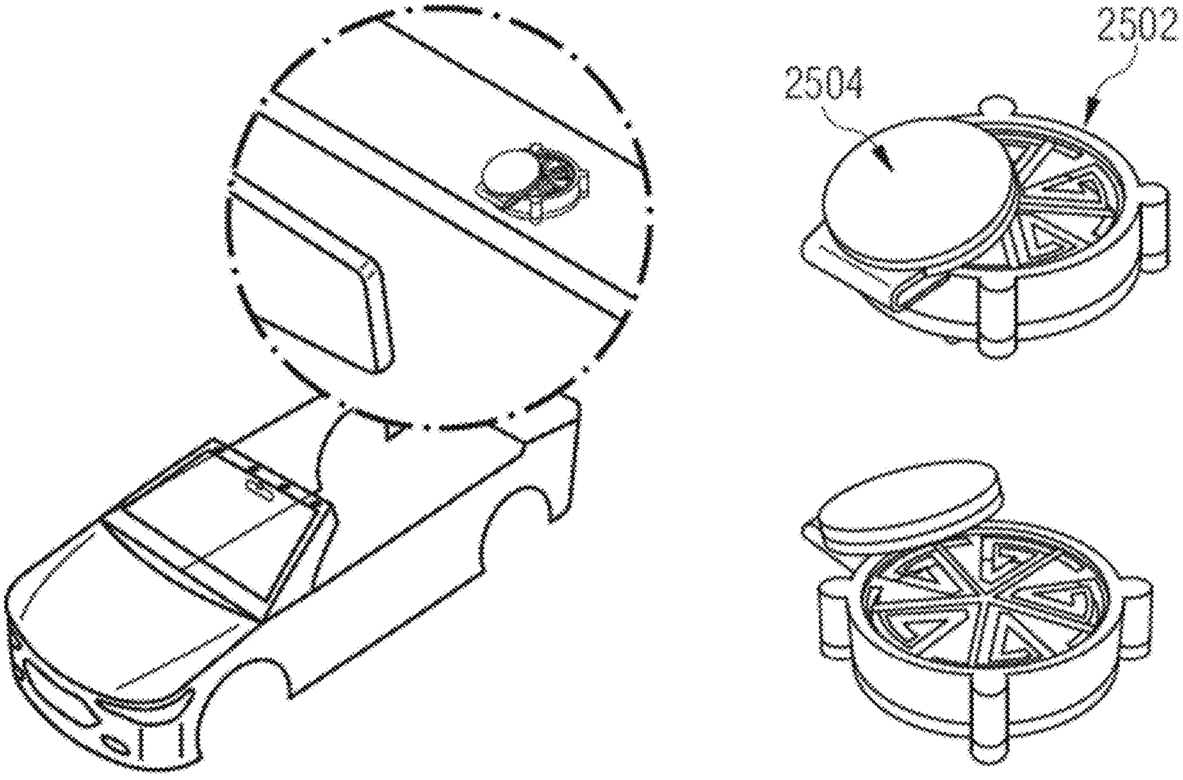
FIG. 25 depicts placement of the antenna in a vehicle.

According to one aspect of the disclosure, the antenna unit disclosed herein may be placed on the front glass (windshield) of a vehicle. As an example, the placement may be toward an upper edge of the glass, along the center line, as depicted in FIG. 25. In this figure, the antenna unit is depicted as 2502. The antenna unit 2502 may be connected to the vehicle through any means desirable. According to one aspect of the disclosure, the antenna unit 2502 may be connected to the vehicle using an adhesive 2504. An antenna holder (such as a holder connecting the antenna unit to the adhesive) may be necessary to keep the antenna in the desired location on the mirror. This scenario may also include the optional use of several antenna elements located along the upper edge of the front glass. Among the main effects of this scenario is the ease of integration because there is no need for car-body modifications. This may permit the antenna unit to be utilized either as an original equipment or as an aftermarket option. Simulations of the antennas with a holder in the antennas without a holder showed that the presence of an antenna holder is likely to have only minimal effect on the antenna performance. Specifically, and based on the simulation, the presence of the antenna holder had essentially no effect on the antenna tuning and direct resonance. It was further evident that radiation efficiency and radiation patterns similarly remain unaffected.

Figure 26A:
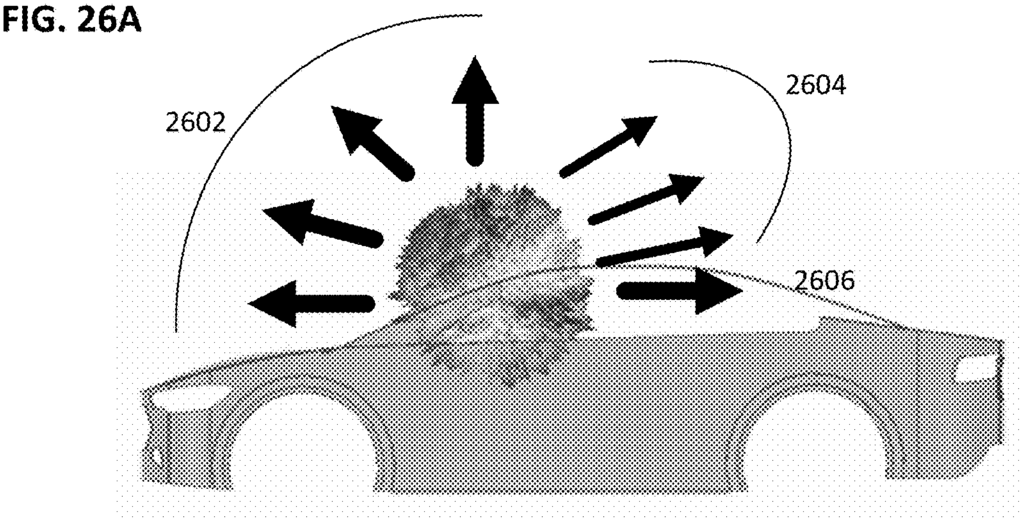
FIGS. 26A and 26B depict magnitudes of directional radiation.
Figure 26B:
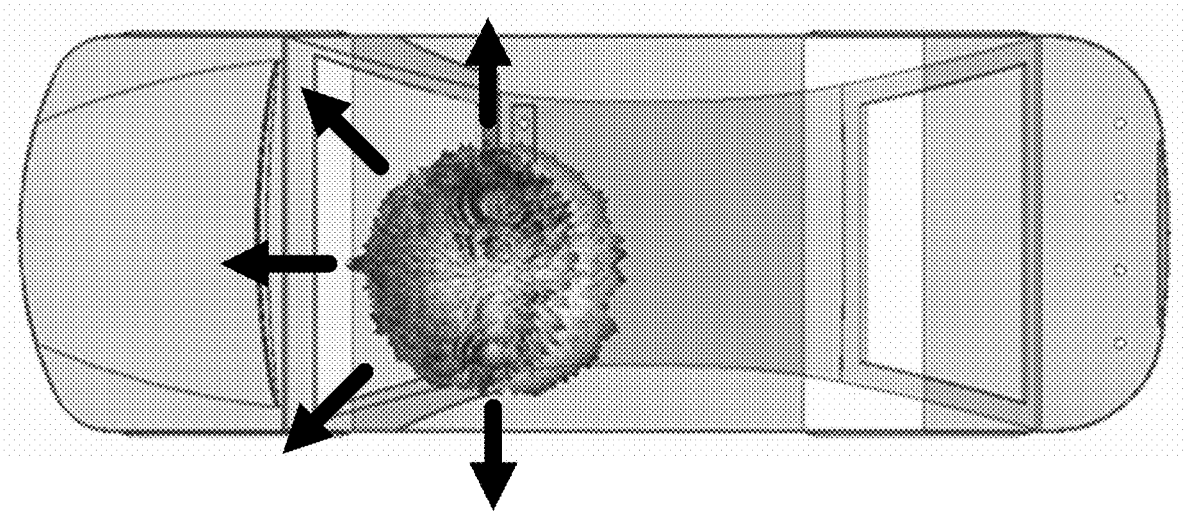

Although the presence of the antenna holder may have little to no impact on the antenna unit's radiation patterns, the vehicle itself may have non-negligible effects on the radiation patterns. This may be seen, for example, in FIGS. 26A to 26B, which depict the magnitude of directional radiation, as indicated by a thickness of arrows. In FIG. 26A, placement of the antenna on the inside of the windshield yielded strong radiation toward the front end top as shown by 2602, weaker radiation toward the upper rear as shown by 2604, and strong radiation directly backwards as shown by 2606. The installation in the vehicle yielded a multitude of peaks that provide a "noisy" look to the radiation pattern, which is most likely due to reflection of the waves from the multiple surfaces of the vehicle. The areas of reduced radiation appear to result from the roof. Although radiation appears to be reduced due to the roof, this decreased radiation appears to be largely compensated for by strong directivity towards the rear of the vehicle. FIG. 26B shows that the radiation pattern appeared to be strong extending toward the front of the vehicle, laterally away from the vehicle, and in between.

Figure 27:
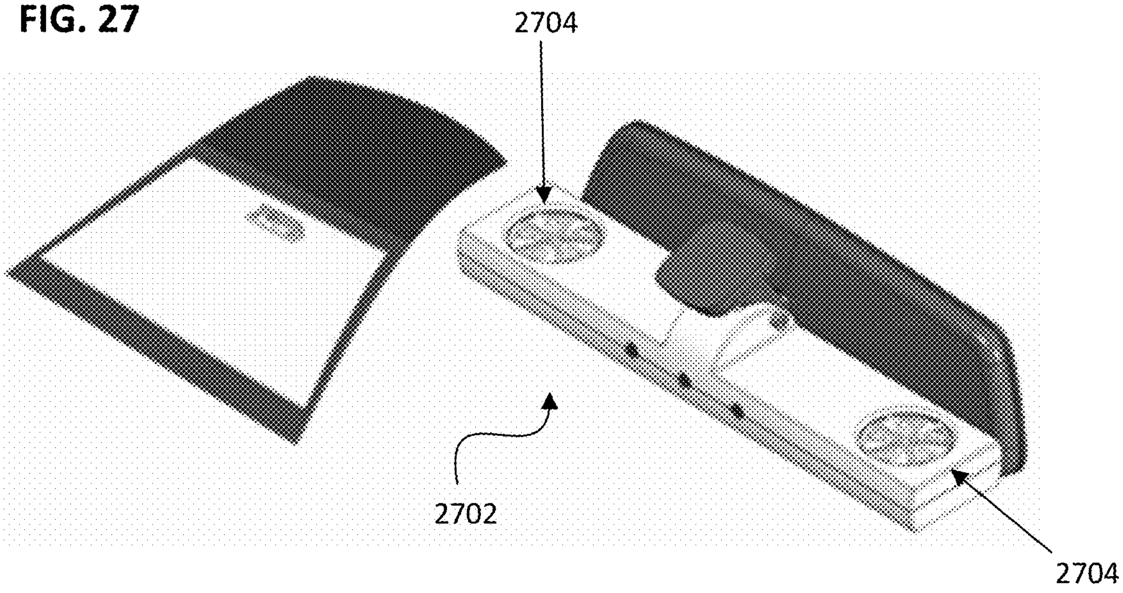
FIG. 27 depicts a module including one or more antenna units and one or more sensors.

It was also desired to consider placement of the antenna in a stand-alone module on the rear-view mirror. Given that this location is often used in modern vehicles for video cameras or other sensors, the antenna unit disclosed herein may be combined with one or more cameras or other sensors to form a unified module. This unified module including the antenna unit and one or more additional sensors could be manufactured as a standard component, thereby increasing modularity and reducing costs. This configuration is depicted in at least FIG. 27, which shows a module 2702 including one or more antenna units 2704 according to this disclosure and one or more sensors.

In a simulation of the module function on the antennas, the simulation revealed that the beam of the antenna placed in the module may be slightly tilted towards the direction opposite to the rear-view mirror, compared to a stand alone antenna. As in the previous case, full vehicle analysis shows that the radiation pattern may present areas of reduced directivity along the roof; however, the coverage in most directions remains similar to that of the previous scenario. In contrast to the previous scenario, the coverage also decreases towards the side, due to the presence of the module housing. However, given the symmetry of the problem, this is expected to be compensated by the second antenna of the module.

Figure 28:
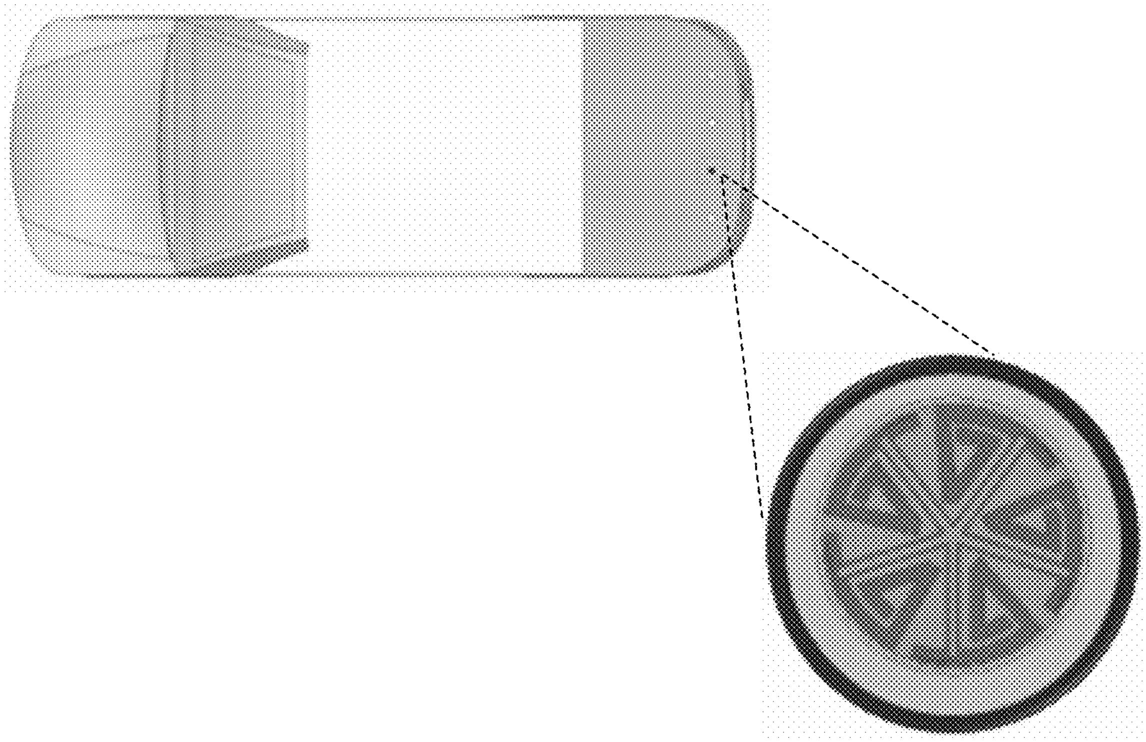
FIG. 28 depicts the antenna being mounted flush with the vehicle trunk.

As an additional scenario, it was desired to evaluate placement of the antenna at the trunk of a convertible vehicle. FIG. 28 depicts the antenna being mounted flush with the vehicle trunk, according to an aspect of the disclosure. The radiation performance in this case is remains nearly omni-directional (similar to the stand alone antenna), but with the presence of increased directivity lobes due to the vehicle body impact.

According to an aspect of the disclosure, an antenna unit is disclosed herein, the antenna unit including a plurality of antennas, each of the plurality of antennas arranged to radiate in a unique directional pattern, away from a common axis; and one or more switches, configured to selectively connect one or more of the plurality of antennas to, or disconnect one or more of the plurality of antennas from, a common radiofrequency feed.

The plurality of antennas may be configured to radiate essentially perpendicularly to the common axis. That is the plurality of antennas may project generally from a central point, such that an omni-directional or quasi-omni-directional pattern is created by a concurrent or simultaneous transmission of each of the plurality of antennas, when transmitting from a common radiofrequency feed. In this manner, although the antennas may each be directional antennas (e.g., unidirectional), they can be arranged to create an essentially 360 degree pattern that is similar to that of an omni-directional antenna. One way to arrange the antennas to achieve this aim is to have them radiate away from a central focal point. This is presented, however, as a possible solution, and it is not intended to be a limiting example. It is expressly contemplated that there could be reasons for which the antennas would be configured in groups or subsets, each group or subset configured to project away from its own focal point. In this scenario, a plurality of focal points could be used. However, as long as the resulting radiation pattern were generally a 360 degree pattern, or as long as the resulting pattern generally resembled (or could be configured to resemble, if all antennas were configured to radiate simultaneously or concurrently) an omni-directional pattern, then multiple focal points could also be used.

According to an aspect of the disclosure, the plurality of antennas may be arranged in a common plane. That is, the antennas may be arranged, for example, within a common x-y-plane and be configured to radiate in an approximately omni-directional pattern. Although a common x-y-plane is a constructive device with which to describe the antenna arrangement, it is expressly contemplated that small deviations from a common x-y-plane could also be tolerated and be within the antenna configuration disclosed herein. For example, if at least two antennas were placed along different positions of a z-axis, they would no longer be coplanar in an x-y-plane; however, depending on the distance between them along the z-axis, it may still be possible for the antenna arrangement to radiate in a quasi-omni-directional pattern and thus fulfill an aim of the disclosure.

According to an aspect of the disclosure, the one or more antennas may be slot antennas. Although any antenna may be selected, slot antennas may be particularly well-suited for certain applications (i.e., vehicle installations), in which it may be desirable to have essential flat antennas that can be mounted within their housing such that they are generally flush with an outer surface. In configurations in which it is acceptable for the antennas to be visible, the slot antennas can be flush-mounted with an outer surface (i.e., an outer surface of a vehicle, etc.). In configurations in which it is preferred that the antennas are not visible, the slot antennas can be recessed-mounted in the housing, and a cap or cover may cover the housing such that the cap or cover is essentially flush-mounted with an outer surface.

The antennas may be configured to be mounted in a housing, which preserves a generally hollow space on at least one side of the antennas. As described herein, the preservation of a generally hollow space may contribute to the functionality of the antennas. Although a generally hollow space is desirable, it is not necessary that the housing be empty other than the antennas. Certain tolerances for cables, circuit boards, and the like may exist, in which such items may be in or a part of the housing, and the antennas may perform acceptably. Furthermore, as disclosed herein, it may be possible to reduce the need for cables by implementing photo-control of the antennas (i.e., switching the antennas on and off based on light signals from light emitting elements and phototransistors) and/or through built-in/pre-printed conductive lines within a printed circuit board/microstrips.

The housing may be subdivided by a plurality of walls. The walls may be essentially perpendicular to the one or more antennas, to separate the antennas from one another. The walls may be of a material that may perform a shielding function (i.e., metal, etc.) that may prevent or reduce coupling of two nearby antennas to one another. By reducing or preventing this coupling, antenna performance can be improved. Moreover, the creation of such walls within the housing may foster the use of photo-control (light emitting elements and phototransistors), since the walls may block light from traveling to nearby phototransistors for unintended antennas. In the event that it were desired for a specific implementation not to have metal walls, an alternative wall-material could be used. Assuming that the material were reasonably opaque, the antennas may benefit from the improved photo-control, even if the wall-material could not realize the improved antenna functionality by reducing antenna coupling.

Impedance matching may be employed in the antennas disclosed herein. There is generally a significant impedance mismatch between radiofrequency antennas and the systems that control them. Such impedance mismatch reduces antenna performance. One or more impedance matching circuits may be employed to match, or better-match, the impedance of the antennas and the radiofrequency system. Any known method of impedance matching may be employed. According to one aspect of the disclosure, the impedance matching may use one or more of transformers, resistors, inductors, capacitors and/or transmission lines.

The antenna units described herein may be controlled by one or more processors. Said processors may be configured to send one or more control signals to control the one or more switches to selectively connect or disconnect the antennas to/from the radiofrequency feed based the one or more control signals.

The term "switches" is used generally herein to be any kind of device that is capable of selectively connecting the one or more of the plurality of antennas to, or disconnecting the one or more of the plurality of antennas from, the common radiofrequency feed. These may include, but are not limited to transistors, phototransistors, field effect transistors, MOSFETs, diodes, PIN-diodes, etc.

Although the housing as disclosed herein may be depicted and/or described as being generally circular, the housing may be of any shape whatsoever. The use of a circular housing herein, as opposed to another housing shape, for consistency and demonstrative purposes and is not included to be limiting. Alternative housing shapes include, but are not limited to, square, rectangular, octagonal, hexagonal, or any other shape. According to one aspect of the disclosure, the shape may be selected based on a structure on/in which the antenna housing is to be placed.

The following description of beam shape configuration addresses a second aspect of the disclosure.

Next generation communication systems may require large-scale antenna systems with beamforming capability. This would be expected to result in higher signal to noise ratio, more coverage, and reduced interference. However, depending on the application, some beam patterns may be more desirable than others. For example, in dense environments, patterns with lower side lobes may be more important than maximum main beam power. When there is high mobility, wider beams may be more important to maintain a communication link and reliability longer time in a given direction. A flexible codebook design method (amplitude and phase excitation selection for antenna elements) for large antenna systems using flush-mounted antenna elements is described herein.

The principles and methods disclosed herein may be used for designing a desired beam shape and codebook, including, but not limited to, side lobe reduction; beam broadening; main beam maximization, etc.

Figure 29:
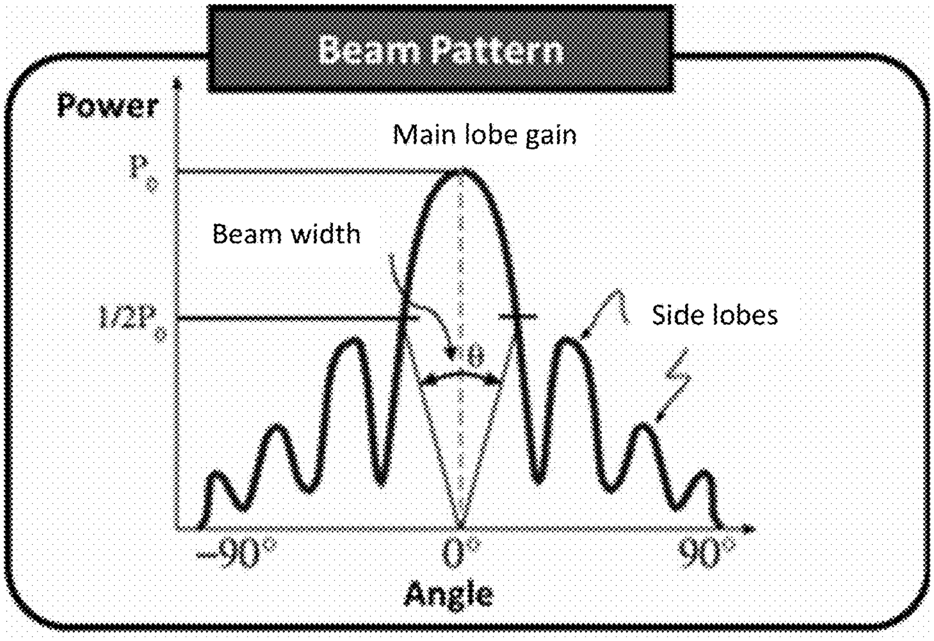
FIG. 29 depicts utilization of a beamforming codebook with a vertical rectangular array.

It is known to utilize a beamforming codebook with a vertical rectangular array as shown in FIG. 29. Such beamforming codebooks and antenna array structures have the drawback, however, of beamforming only half of the space that it is facing, or having large back-lobe and grating lobes if the antenna element spacing is large. In addition, these antennas require large spacing in a z-direction, which may not be feasible for thin devices.

Figure 30:
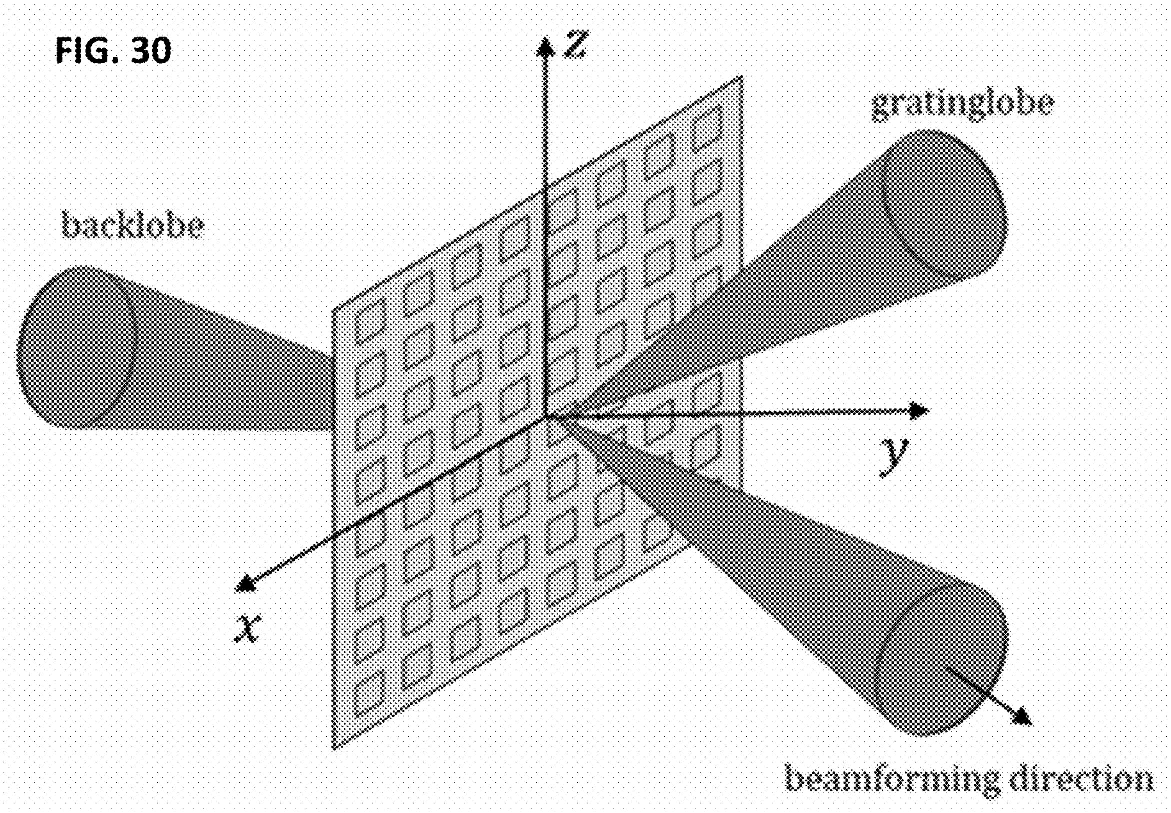
FIG. 30 depicts an arbitrary antenna.

In light of these drawbacks, an optimization procedure is also disclosed herein. By way of background, an arbitrary antenna array as shown in FIG. 30 is first considered. Without loss of generality, x-y-z coordinates may be centered in the middle of the antenna array. Thereafter, the far field array factor $a(\varphi)\in\mathbb{C}^{1\times N}$ may be written for a circular antenna array as:

$$a(\varphi)=\left\{e^{-j\frac{2\pi}{\lambda}r_i cos(\theta_i-\varphi)}\right\}_{i=1}^{N} \tag{1}$$

where N is the total number of antennas, $\theta_i$ and $r_i$ is the azimuth angle and the radius of the center location of the antenna element i, i=1, . . . , N. $\varphi$ is the steering angle of the array factor. An arbitrary antenna pattern for each antenna element is also considered. For this, the antenna pattern for antenna element i will be denoted as $p_i(\varphi)$, $0\le\varphi\le 360°$. With this, the antenna element can be incorporated into the array factor by:

$$\tilde{a}(\varphi)=\left\{p_i(\varphi)e^{-j\frac{2\pi}{\lambda}r_i\cos(\theta_i-\varphi)}\right\}_{i=1}^{N} \tag{2}$$

It may be desired to have an array gain for every $\varphi\in[0°, 360°]$. For this, a phase and amplitude excitation $w_n$, $1\le n\le N$ may be designed such that $|w_n|\le 1$. The beamforming vector may be denoted as $w=[w_1, \ldots, w_N]$. Furthermore, the array gain at $\varphi$ may be given by:

$$g(\varphi)=|w^H\tilde{a}(\varphi)| \tag{3}$$

In order to have the desired array pattern, the least square minimum and upper bound constraints on the array gain may be defined as a function of φ. In addition, $p_k$ may be defined as an upper bound on the array gain at azimuth angle $\varphi_k$, k=1, . . . , K, and $s_m$ as a least square constraint at azimuth angle $\varphi_m$, m=1, . . . , M. Accordingly, the least square optimization algorithm can be written as:

$$\min_{w}\sum_{k=1}^{K}\left|p_k e^{j\delta_k} - w^H\tilde{a}(\varphi_k)\right|^2 + \sum_{m=1}^{M}\left|s_m e^{j\delta_m} - w^H\tilde{a}(\varphi_m)\right|^2 \tag{4}$$

such that $$\left|w^H\tilde{a}(\varphi_k)\right| \le p_k \;\; k = 1, \ldots , K$$

$$|w_n| \le 1, n = 1, \ldots , N$$

Figure 31:
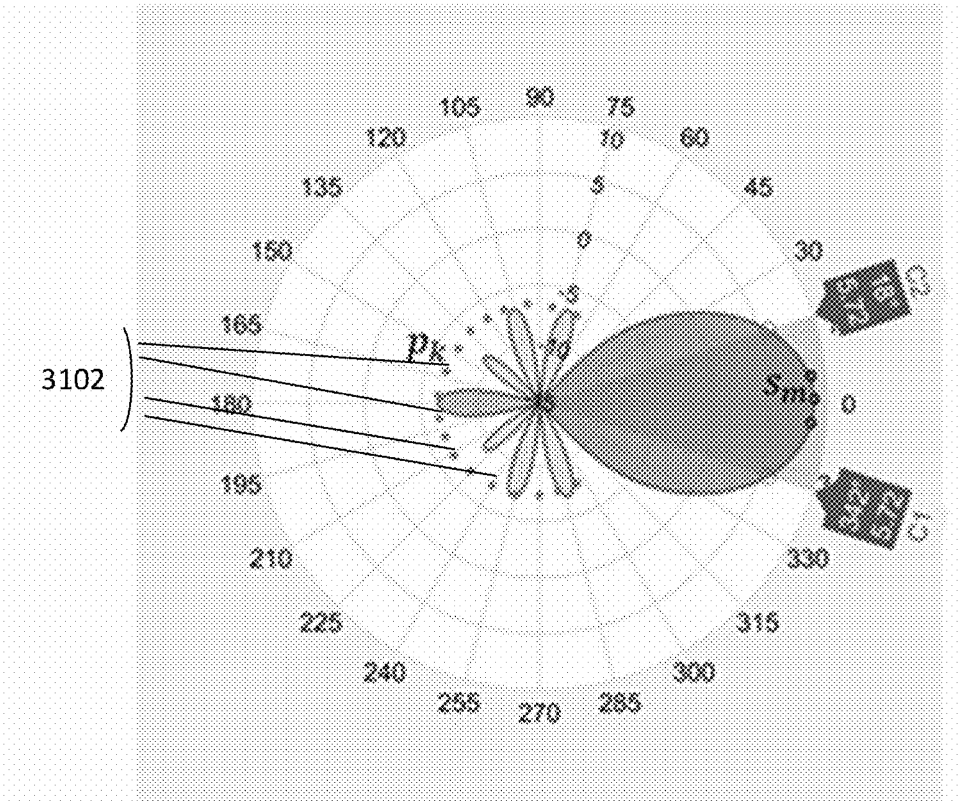
FIG. 31 depicts an example constraint on an array pattern to reduce sidelobes.

In the above optimization problem, $\delta_k$ and $\delta_m$ are auxiliary variables. The optimization problem may be solved using an algorithm. An example constraint on an array pattern to reduce sidelobes may be seen in FIG. 31. This figure depicts an array pattern with upper bounds and least square error constraints. The constraints are depicted as small dots, a portion of which have been labeled as 3102. In the figure, the constraints are set to reduce sidelobe and to maximize main beam gain. Said constraints may be selected by a user to achieve a desired beam shape. Note that, these constraints should be feasible; that is, the optimization problem should have a solution, such that an array pattern may be obtained.

Figure 32A:
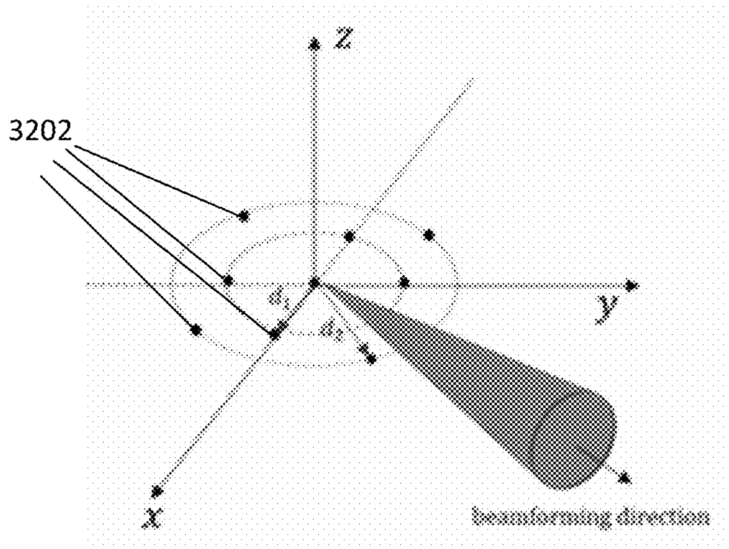
FIGS. 32A and 32B depict a multi-circular antenna array for azimuthal beamforming.
Figure 32B:
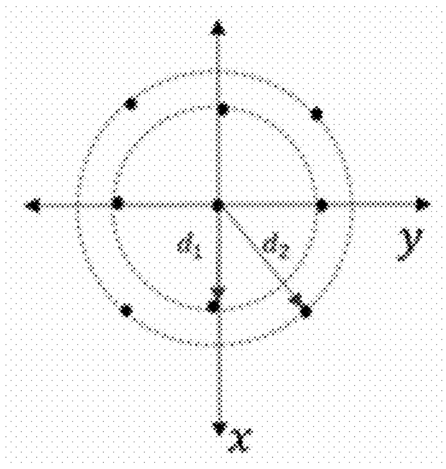

Moreover, other constraints may be applied to obtain alternative beam shapes, such as, for example, beam broadening. Using above optimization problem, a multi-circular antenna array for azimuthal beamforming is disclosed. FIGS. 32A and 32B depict such an antenna array, according to an aspect of the disclosure. In these figures, a multi-circular planar antenna array for azimuthal beamforming can be seen. FIGS. 32A and 32B include several black dots (e.g., at 3202). The antenna array may include C (e.g. C=2) circular arrays with equal antenna element spacing over the circle and 1 antenna in the middle. In this figure, $d_1$, and $d_2$ are radius of first and second circular arrays, respectively. $N_1$ and $N_2$ may be understood as the number of antennas at first and second circle, respectively. Although the antenna depicted here is a half-wavelength antenna, the antenna spacing can be different than half-wavelength.

The proposed antenna array may provide the following effects over an arbitrary antenna array. First, since the antenna array is circularly symmetric, a beamforming vector designed for one direction may be used in another direction having the same configuration. For example, if $d_1=d_2$, the beamforming vector for 45 degrees can be obtained by circularly shifting beamforming vector of 0 degree by 1 element. A circular array allows for better control of grating lobes (if antenna spacing is larger than half-wavelength) and side-lobe in all directions. Finally, a central antenna permits better control of back-lobes.

Figure 33A:
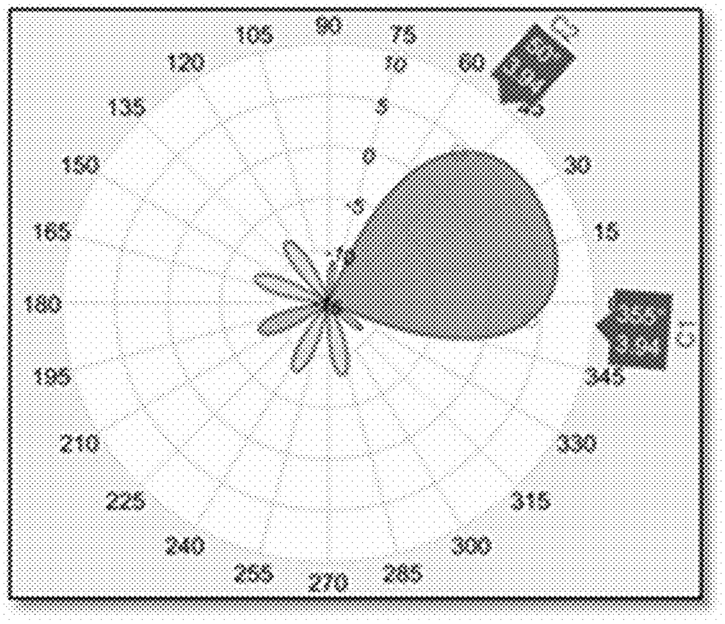
FIGS. 33A and 33B depict simulation results of the antennas in FIGS. 32A and 32B.
Figure 33B:
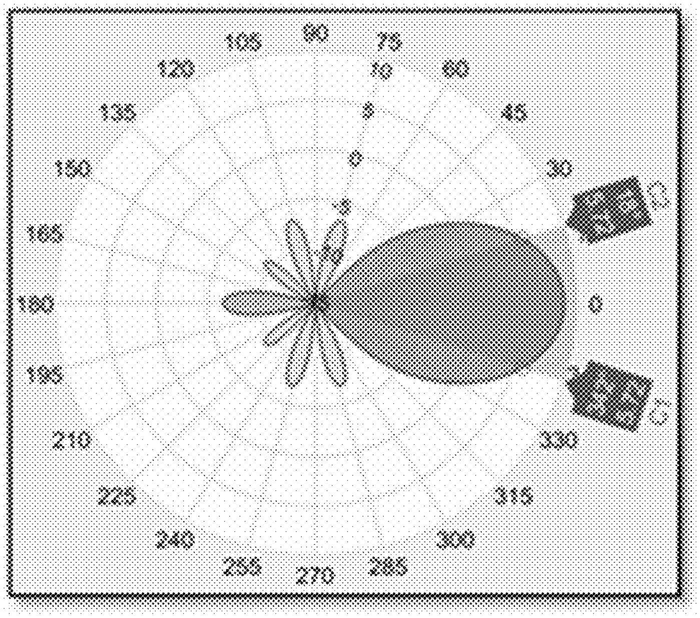

The antennas of FIGS. 32A and 32N were simulated, as depicted in FIGS. 33A (beamforming toward 22.5 degrees) and 33B (beamforming toward 0 degrees), in which beamforming with an 8.5 dB main beam gain and a 15 dB sidelobe reduction is depicted, with antenna spacing at 0.5λ. In this simulation, two codebooks were provided: a main beam maximization with 15 dB sidelobe reduction, and a beam broadening codebook. For the main beam maximization with 15 dB sidelobe reduction, the following parameters were used: $d_1=d_2=0.65\lambda$. For this antenna array setting, two beamforming vectors steering towards 0 degree and 22.5 degree were necessary, as depicted in FIGS. 33A and 33B. By circularly rotating the beamforming vector, the beams could be steered towards other directions.

Figure 34A:
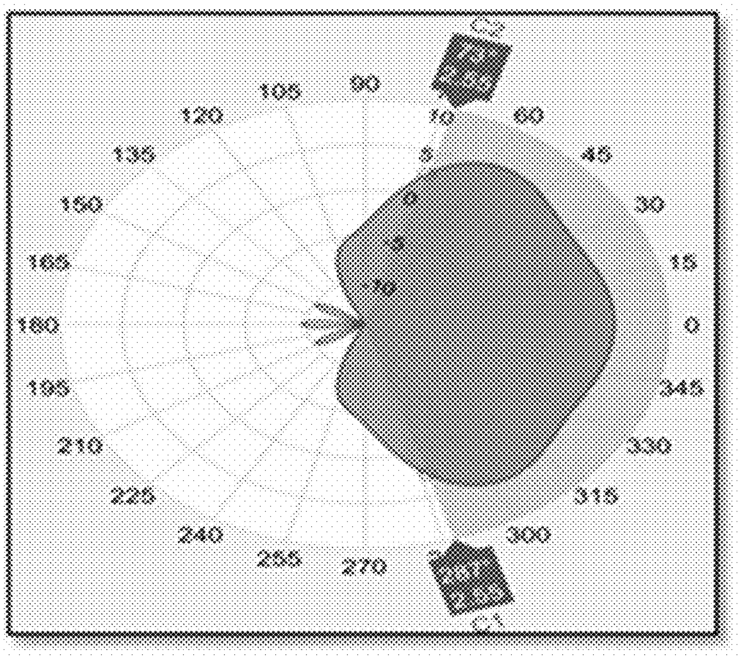
FIGS. 34A and 34B depict two beam patterns with 166 degree and omni-directional patterns, respectively.
Figure 34B:
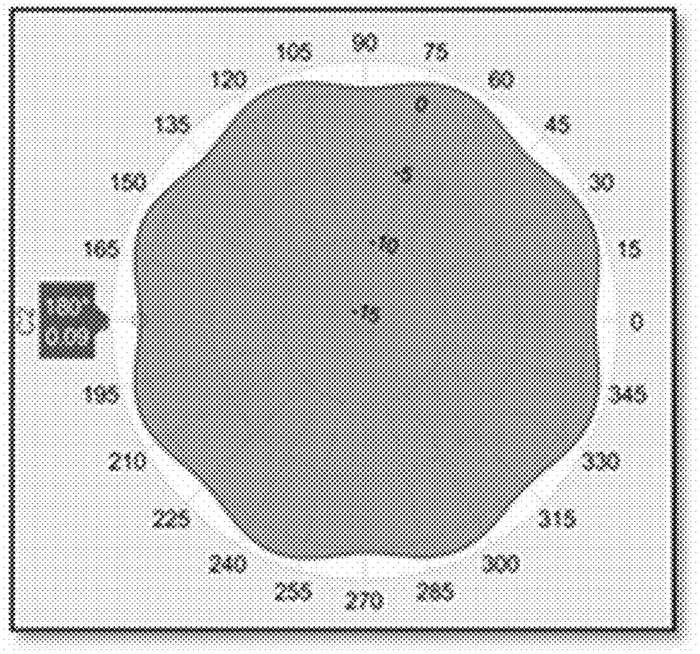

The following beamforming vectors were used: w=[−0.95, −0.99i, −0.08−0.49i, −0.52, −0.08+0.49i, 1i, −0.08+0.49i, −0.52, −0.08−0.49i], for the 0 degree beamforming direction; and w=[−0.99, 0.02−1i, 0.02−1i, −0.41−0.22i, −0.41+0.22i, 0.02+0.99i, 0.02+0.99i, −0.41+0.22i, −0.41−0.22i] for the 22.5 degree beamforming direction. For beamwidth control, wider half-power beam widths (HPBW) using the same antenna array configuration were considered. For example, two beam patterns with 166 degree and omni-directional pattern were considered, as shown in FIGS. 34A (HPBW of 166 degrees) and 34B (omni-directional), which use an antenna spacing of 0.57λ.

Figure 35:
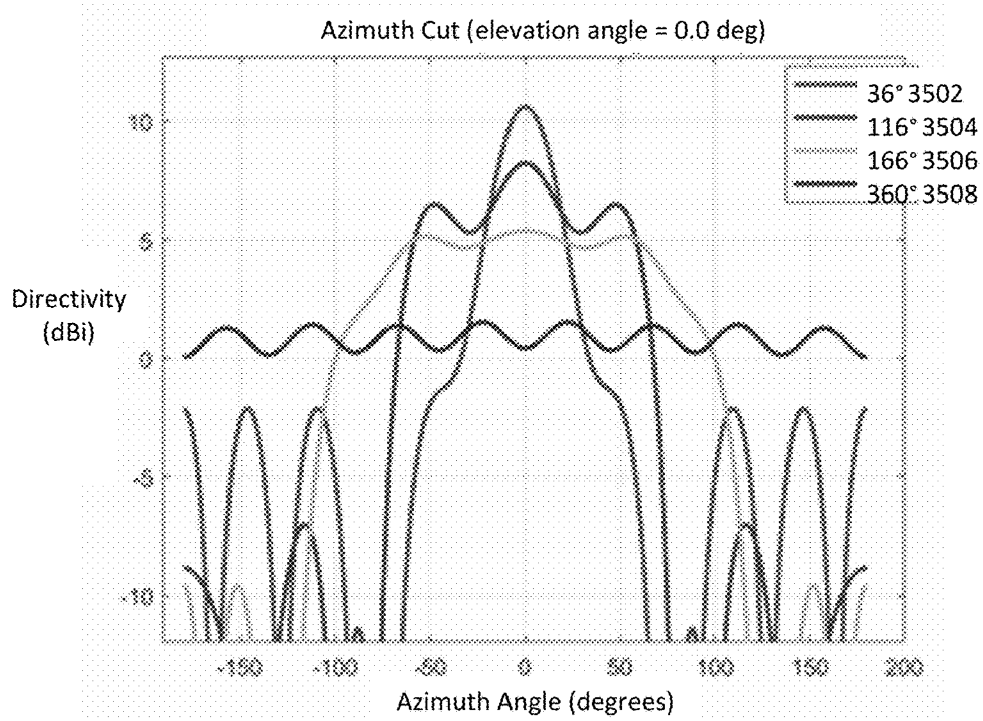
FIG. 35 depicts beam patterns for 36, 116, 166, and 360 degrees.

FIG. 35 depicts beam patterns for 36, 116, 166, and 360 degrees. This figure shows broad beam patterns with various HPBWs, wherein the antenna spacing is 0.57λ. The beam pattern at 36° is depicted as 3502; the beam pattern at 116° is depicted as 3504; the beam pattern at 166° is depicted as 3506; and the beam pattern at 360° is depicted as 3508. The beamforming vectors are: w=[−1, 0.16−0.5i, −0.16−0.18i, −0.75, −0.16+0.18i, 0.16+0.5i, −0.16+0.18i, −0.75, −0.16−0.18i], for 36 degree half power beam width; w=[−1, 0.5−0.80i, −0.36, 0.59+0.80i, −0.36, −0.04−0.5129i, −0.04+0.51, −0.04+0.51i−0.04−0.51i], for 116 degree half power beam width; w=[−1, 0.14−0.71i, 0.55, 0.14+0.71i, 0.55, 0.37−0.63i, 0.37+0.63i, 0.37+0.63i, 0.37−0.63i], for 166 degree half power beam width; and w=[−1, 1−0.02i, 1−0.01i, 1, 1+0.01i, 1+0.02i, 1+0.01i, 1, 1−0.01i], for 360 degree half power beam width.

Figure 36:
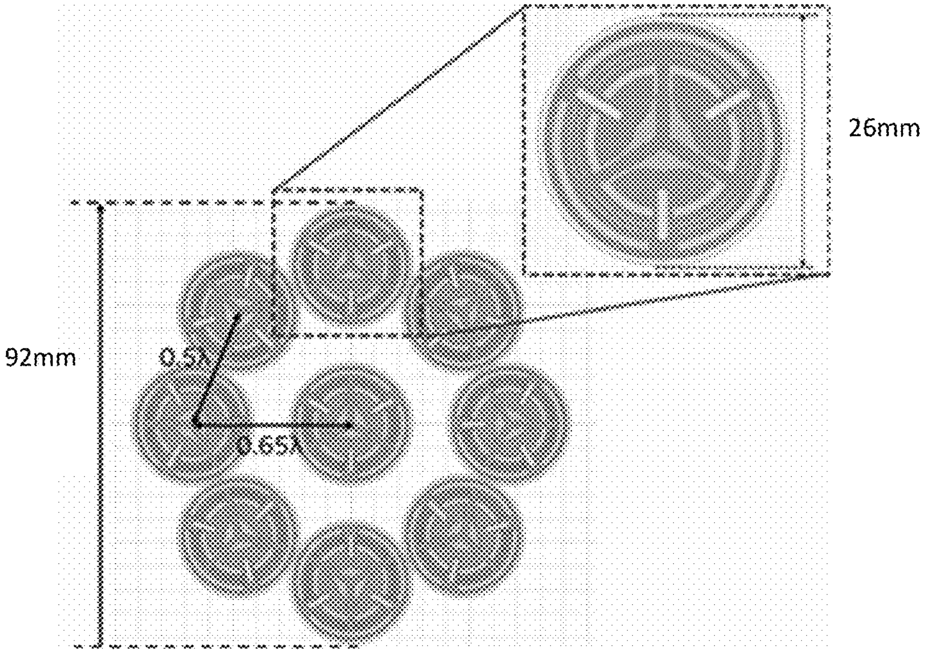
FIG. 36 depicts the designed circular antenna array architecture according to an aspect of the disclosure.

FIG. 36 depicts the designed circular antenna array architecture (9 elements) according to an aspect of the disclosure. In order to suppress the side lobe level (SLL), the element space between outer adjacent elements may be designed as 0.5λ, at 5.825 GHz, and 0.65λ between outer and center element.

Figure 37:
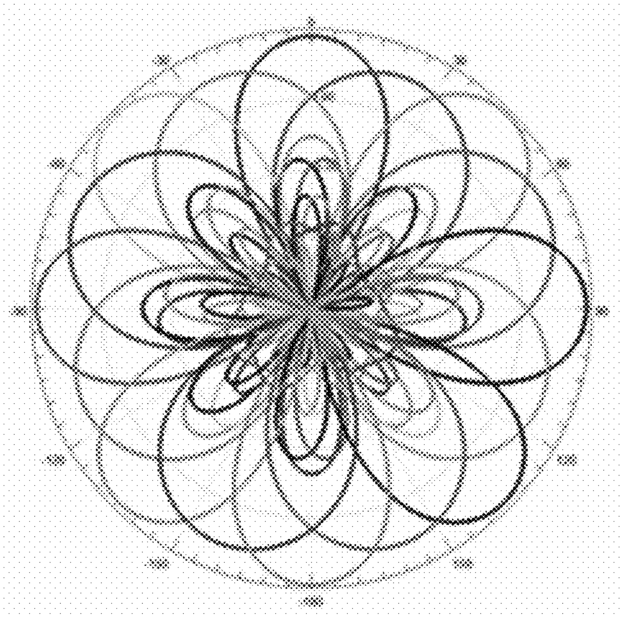
FIG. 37 depicts a simulated radiation pattern with designed code book.

FIG. 37 depicts a simulated radiation pattern with designed code book. This result exhibits the proposed circular array architecture with designed code book that realizes the entire 360° azimuth beam forming coverage without any blind spots.

Figure 38:
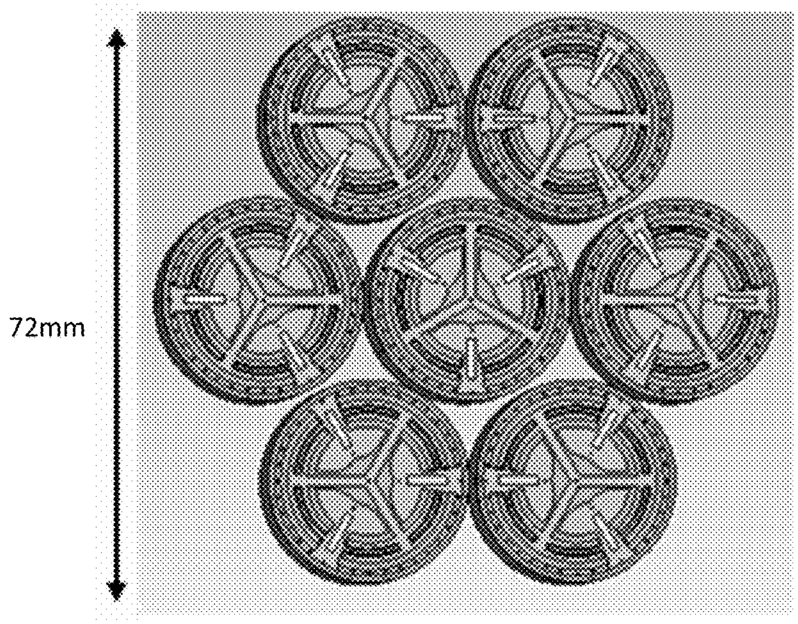
FIG. 38 depicts an antenna array having a reduced number of antenna elements and a reduced dimension.

According to another aspect of the disclosure, an alternative array configuration may be designed as shown in FIG. 38, said array having a reduced number of antenna elements (from 9 elements to 7 elements, in this example) and with reduced dimension (from 92 mm diameter to 72 mm diameter). Even with the reduced size and number of elements, tests reveal that the antenna array can support beamforming in the horizontal plane with the codebook inputs.

Figure 39:
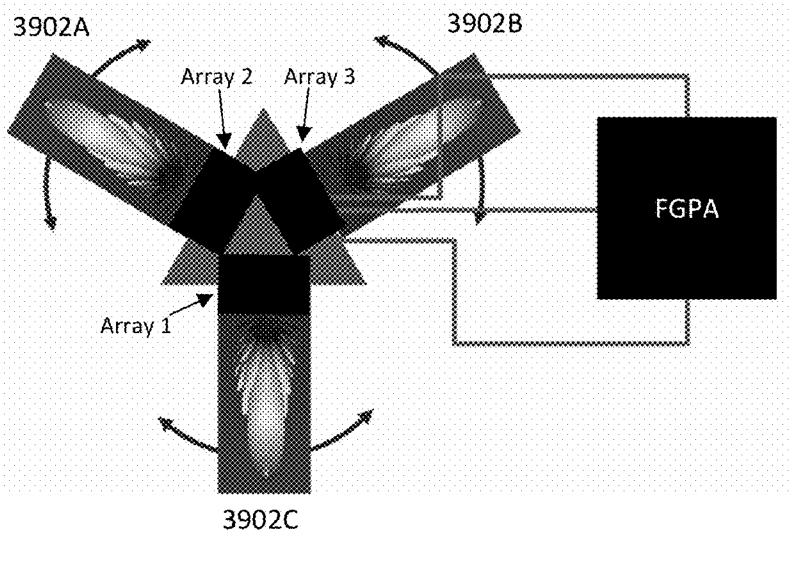
FIG. 39 illustrates an example of sectoral array design.

This array concept may be extended to include sectoral array design, thereby offering independent beamforming amongst multiple array configurations. FIG. 39 illustrates an example of sectoral array design, with three independent antenna array set covering each 120 degrees per sector (showing sectors 3902A, 3902B, and 3902C). According to an aspect of the disclosure, each sector antenna array may be configured to perform independent beamforming, said beamforming being dynamically controlled by a plurality of codebook inputs (e.g., three codebook inputs) from the FPGA. The number of sectors may be any number, depending on the implementation. This antenna array concept may improve wireless system performance significantly by mitigating unwanted interferences and changing the beam direction to the desired direction.

Figure 40A:
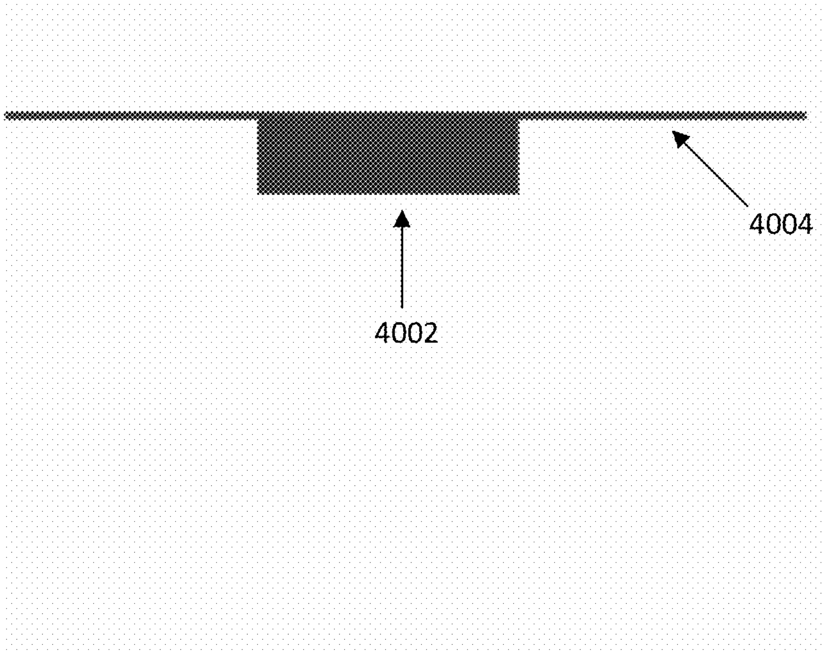
FIGS. 40A and 40B depict installation options of the sectoral antenna array on the ceiling and a tall post for picocell and small cell applications.
Figure 40B:
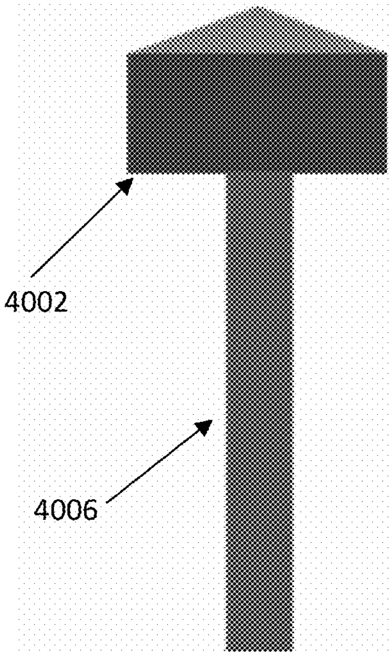

FIGS. 40A and 40B depict installation options of the sectoral antenna array on the ceiling and a tall post for picocell and small cell applications. In FIG. 40A, the sectoral array antenna 4002 is installed on a ceiling 4004. In FIG. 40B, the sectoral array antenna 4002 is shown as being installed on a post 4006.

The antenna array disclosed herein may be configured to be controlled by one or more processors. The one or more processors may be configured to select, based on first input data representing one or more beam shape attributes, one or more antenna arrays of a plurality of antenna arrays including a center antenna array and a plurality of outer antenna arrays arranged around the center antenna array, for excitation based on the received input data; and send a control signal, configured to control the selected one or more antenna arrays to radiate according to the one or more beam shape attributes.

The antenna configuration disclosed herein may include a plurality of antenna units. The antenna units may be antenna-in-package. The antenna units may be contained, or self-contained, within a housing. The housing may be circular. The antenna units may include a plurality of antennas. According to one aspect of the disclosure, the number of antennas in each antenna unit may be three. Fewer or greater than three antennas per antenna unit are also possible, without limitation.

The antenna units may be arranged in an essentially circular form. The essentially circular form may simplify the ability to selectively radiate in any direction of a 360 degree circumference.

According to one aspect of the disclosure, the antenna units may be arranged in an essentially circular form with gaps between the antenna units. As disclosed herein, the gaps may improve functionality. Moreover, the gaps may be practical for certain applications, as said gaps may aid in installation, mounting, disguising of the antennas, etc.

According to an aspect of the disclosure, the essentially circular form may have a center antenna. In this configuration, the remaining antennas may be arranged in an essentially circular pattern around the center antenna. As disclosed herein, the presence of the circular antenna may improve functionality.

According to an aspect of the disclosure, the first input data may include an upper bound and a lower bound for a beam shape. That is, an upper degree and a lower degree may be provided, such that the beam should be desirably contained within the provided bounds. For example, it may be desired to generate a beam that radiates between 25 degrees and 45 degrees from a reference point. The corresponding beam may be generated as disclosed herein.

According to another aspect of the disclosure, the first input data may include a desired beam gain. Beam gain may be used to determine the spread of a beam shape. Based on the desired beam gain as provided in the first input data, and using the methods disclosed herein, the one or more processors may be configured to determine a codebook for the desired beam gain and/or the desired bounds.

According to another aspect of the disclosure, the input data may include one or more sidelobe constraints. It may be desirable to reduce or constrain one or more sidelobes. If so desired, boundaries for the sidelobes (i.e., sidelobe constrains) may be included in the first input data, and the codebook representing the desired sidelobe may be determined as disclosed herein.

One effect of the circular array configuration is ease of changing directions of a given beam. In the event that it is desired to radiate a first beam shape in a first direction, and then to radiate the first beam shape in a second direction (the second direction being different from the first direction), the circular formation may permit the radiation in the second direction without the need to determine a new codebook for the beam shape. That is, to achieve the first beam shape, one or more processors may need to perform the calculations disclosed herein to derive a codebook that results in the first beam shape in the first direction. To radiate this first beam shape, one or more antenna units may be activated (e.g. excited). If the beam shape is to remain essentially the same, but it needs to be transmitted in a new direction, it may be possible to utilize the same codebook as was previously calculated, but simply to control a different one or more antenna units to radiate according to the codebook that was used for the first beam shape. Because the antenna units are arranged in a circle, the direction may be changed by simply directing the signal to different antenna units. This may save calculation and processor resources.

Figure 41:
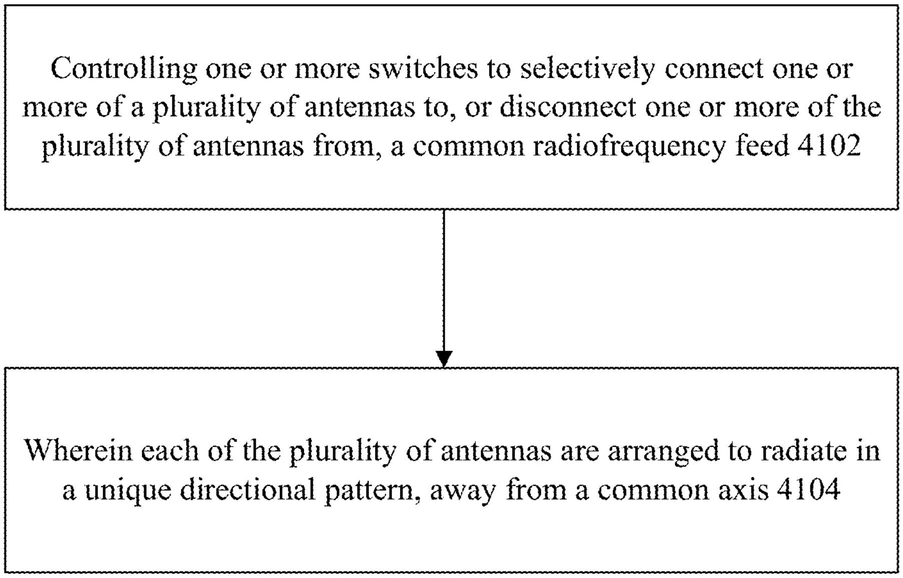
FIG. 41 depicts a method of antenna direction control according to a first aspect of the disclosure.

FIG. 41 depicts a method of antenna direction control according to the first aspect of the disclosure, the method including controlling one or more switches to selectively connect one or more of a plurality of antennas to, or disconnect one or more of the plurality of antennas from, a common radiofrequency feed 4102; wherein each of the plurality of antennas are arranged to radiate in a unique directional pattern, away from a common axis 4104.

Figure 42:
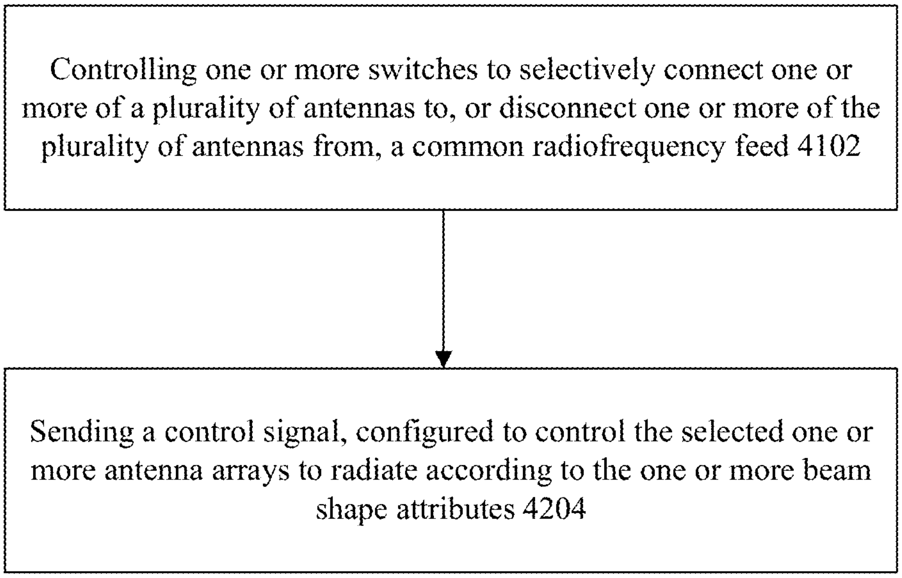
FIG. 42 depicts a method of antenna array control according to a second aspect of the disclosure.

FIG. 42 depicts a method of antenna array control according to the second aspect of the disclosure including selecting, based on first input data representing one or more beam shape attributes, one or more antenna arrays of a plurality of antenna arrays including a center antenna array and a plurality of outer antenna arrays arranged around the center antenna array, for excitation based on the received input data 4202; and sending a control signal, configured to control the selected one or more antenna arrays to radiate according to the one or more beam shape attributes 4204.

The following examples pertain to further embodiments.

In Example 1, an antenna unit is disclosed, including: a plurality of antennas, each of the plurality of antennas arranged to radiate in a unique directional pattern, away from a common axis; and one or more switches, configured to selectively connect one or more of the plurality of antennas to, or disconnect one or more of the plurality of antennas from, a common radiofrequency feed.

In Example 2, the antenna unit of Example 1, wherein the plurality of antennas are configured to radiate essentially perpendicularly to the common axis.

In Example 3, the antenna unit of Example 1 or 2, wherein the plurality of antennas are slot antennas.

In Example 4, the antenna unit of Example 3, wherein the plurality of slot antennas are each configured to radiate in a unidirectional pattern.

In Example 5, the antenna unit of any one of Examples 1 to 4 is disclosed, further including: a housing, including a bottom surface and a side structure is disclosed, wherein the housing houses the antenna unit, and wherein the housing defines a generally hollow space adjacent to a top or bottom surface of the antenna unit.

In Example 6, the antenna unit of Example 5, wherein the housing further includes a radiofrequency cable, connected to each of the plurality of antennas.

In Example 7, the antenna unit of Example 5 or 6, wherein the housing includes metal.

In Example 8, the antenna unit of any one of Examples 5 to 7 is disclosed, further including: a housing, including a side structure and a cover is disclosed, wherein antenna unit is configured to be mounted in the housing such that at least a portion of the side structure is between the antenna unit and the cover.

In Example 9, the antenna unit of any one of Examples 5 to 8, wherein the housing further includes a plurality of conductive connections, configured to connect each of the plurality of antennas to a radiofrequency feed.

In Example 10, the antenna unit of Example 9, wherein the plurality of conductive connections are mounted in or on a surface of the housing.

In Example 11, the antenna unit of Example 9 or 10, wherein the plurality of conductive connections include microstrips.

In Example 12, the antenna unit of any one of Examples 5 to 11, wherein the housing includes a plurality of walls, substantially perpendicular to the plurality of antennas is disclosed, wherein each of the plurality of walls is mounted between two of the plurality of antennas.

In Example 13, the antenna unit of Example 12, wherein the plurality of walls are metal.

In Example 14, the antenna unit of Example 12 or 13, wherein the plurality of walls are configured to reduce coupling between adjacent antennas of the plurality of antennas.

In Example 15, the antenna unit of any one of Examples 1 to 14, wherein the antenna unit includes one or more impedance matching circuits, configured to match an impedance of the one or more antennas and an impedance of a system to which the radiofrequency feed is connected.

In Example 16, the antenna unit of any one of Examples 1 to 15, wherein the one or more switches include one or more transistors, configured to selectively connect one or more of the plurality of antennas to, or disconnect one or more of the plurality of antennas from, a common radiofrequency feed depending on a control signal.

In Example 17, the antenna unit of any one of Examples 1 to 16 is disclosed, further including: a controller, configured to send a control signal to control the one or more transistors.

In Example 18, the antenna unit of any one of Examples 1 to 17, wherein the one or more switches include one or more phototransistors, configured to receive a light signal and to selectively connect one or more of the plurality of antennas to, or disconnect one or more of the plurality of antennas from, the common radiofrequency feed depending on the received light signal.

In Example 19, the antenna unit of Example 18 is disclosed, further including: a plurality of light emitting elements and a controller is disclosed, wherein the plurality of light emitting elements are each configured to generate a light signal for one or the one or more phototransistors, and wherein the controller is configured to generate a control signal to control the one or more light emitting elements.

In Example 20, the antenna unit of any one of Examples 1 to 19, wherein the plurality of antennas are configured to approximate an omni-directional radiation pattern, when each of the plurality of antennas are connected to the common radiofrequency feed.

In Example 21, the antenna unit of any one of Examples 1 to 20, wherein the antenna unit is configured to be part of an antenna-in-package.

In Example 22, the antenna unit of any one of Examples 1 to 21 is disclosed, further including: a printed circuit board, connected to the antenna unit and the housing.

In Example 23, the antenna unit of Example 22, wherein the printed circuit board includes one or more processors, configured to send a control signal to control the one or more switches to selectively connect one or more of the plurality of antennas to, or disconnect one or more of the plurality of antennas from, a common radiofrequency feed.

In Example 24, the antenna unit of Example 22 or 23, wherein the printed circuit board includes one or more coaxial cable connectors.

In Example 25, the antenna unit of any one of Examples 1 to 24, wherein antenna unit includes at least 5 antennas.

In Example 26, the antenna unit of any one of Examples 1 to 24, wherein antenna unit includes at least 7 antennas.

In Example 27, a method of antenna direction control is disclosed, including: controlling one or more switches to selectively connect one or more of a plurality of antennas to, or disconnect one or more of the plurality of antennas from, a common radiofrequency feed, wherein each of the plurality of antennas are arranged to radiate in a unique directional pattern, away from a common axis.

In Example 28, the method of antenna direction control of Example 27 is disclosed, wherein the plurality of antennas are configured to radiate essentially perpendicularly to the common axis.

In Example 29, the method of antenna direction control of Example 27 or 28 is disclosed, wherein the plurality of antennas are slot antennas.

In Example 30, the method of antenna direction control of Example 29 is disclosed, wherein the plurality of slot antennas are each configured to radiate in a unidirectional pattern.

In Example 31, the method of antenna direction control of any one of Examples 27 to 30 is disclosed, wherein the plurality of antennas are within a housing, including a bottom surface and a side structure, and wherein the housing defines a generally hollow space adjacent to a top or bottom surface of the antenna unit.

In Example 32, the method of antenna direction control of Example 31 is disclosed, wherein the housing further includes a radiofrequency cable, connected to each of the plurality of antennas.

In Example 33, the method of antenna direction control of Example 31 or 32 is disclosed, wherein the housing includes metal.

In Example 34, the method of antenna direction control of any one of Examples 31 to 33 is disclosed, wherein the housing includes a side structure and a cover is disclosed, wherein antenna unit is configured to be mounted in the housing such that at least a portion of the side structure is between the antenna unit and the cover.

In Example 35, the method of antenna direction control of any one of Examples 31 to 34 is disclosed, wherein the housing further includes a plurality of conductive connections, configured to connect each of the plurality of antennas to a radiofrequency feed.

In Example 36, the method of antenna direction control of Example 35 is disclosed, wherein the plurality of conductive connections are mounted in or on a surface of the housing.

In Example 37, the method of antenna direction control of Example 35 or 36 is disclosed, wherein the plurality of conductive connections include microstrips.

In Example 38, the method of antenna direction control of any one of Examples 31 to 37 is disclosed, wherein the housing includes a plurality of walls, substantially perpendicular to the plurality of antennas is disclosed, wherein each of the plurality of walls is mounted between two of the plurality of antennas.

In Example 39, the method of antenna direction control of Example 38 is disclosed, wherein the plurality of walls are metal.

In Example 40, the method of antenna direction control of Example 38 or 39 is disclosed, wherein the plurality of walls are configured to reduce coupling between adjacent antennas of the plurality of antennas.

In Example 41, the method of antenna direction control of any one of Examples 27 to 40 is disclosed, further including: matching an impedance of the one or more antennas of the plurality of antennas and an impedance of a system to which the radiofrequency feed is connected via one or more impedance matching circuits.

In Example 42, the method of antenna direction control of any one of Examples 27 to 41 is disclosed, further including: selectively connecting one or more of the plurality of antennas to, or disconnecting one or more of the plurality of antennas from, a common radiofrequency feed using one or more transistors, depending on a control signal.

In Example 43, the method of antenna direction control of any one of Examples 27 to 42 is disclosed, further including: controlling the one or more transistors using a control signal from a controller.

In Example 44, the method of antenna direction control of any one of Examples 27 to 43 is disclosed, further including: receiving one or more a light signals via one or more phototransistors and selectively connecting one or more of the plurality of antennas to, or disconnecting one or more of the plurality of antennas from, the common radiofrequency feed depending on the received light signal.

In Example 45, the method of antenna direction control of Example 44 is disclosed, further including: generating a light signal for one or the one or more phototransistors using one or more light emitting elements.

In Example 46, the method of antenna direction control of Example 45 is disclosed, further including: controlling the one or more light emitting elements via a control signal from a controller.

In Example 47, the method of antenna direction control of any one of Examples 27 to 46 is disclosed, further including: approximating an omni-directional radiation pattern using the plurality of antennas when each of the plurality of antennas are connected to the common radiofrequency feed.

In Example 48, the method of antenna direction control of any one of Examples 27 to 47 is disclosed, further including: connecting the antenna unit to the housing via a printed circuit board.

In Example 49, the method of antenna direction control of Example 48 is disclosed, further including: sending a control signal to control the one or more switches to selectively connect one or more of the plurality of antennas to, or disconnect one or more of the plurality of antennas from, a common radiofrequency feed.

In Example 50, one or more non-transient computer readable media is disclosed, the media including instructions that are configured to cause one or more processors, when executed, to perform the method of any one of Examples 27 to 49.

In Example 51, one or more processors is disclosed, configured to: control one or more switches to selectively connect one or more of a plurality of antennas to, or disconnect one or more of the plurality of antennas from, a common radiofrequency feed, wherein each of the plurality of antennas are arranged to radiate in a unique directional pattern, away from a common axis.

In Example 52, the one or more processors of Example 51 is disclosed, wherein the plurality of antennas are configured to radiate essentially perpendicularly to the common axis.

In Example 53, the one or more processors of Example 51 or 52 is disclosed, wherein the plurality of antennas are slot antennas.

In Example 54, the one or more processors of Example 53 is disclosed, wherein the plurality of slot antennas are each configured to radiate in a unidirectional pattern.

In Example 55, the one or more processors of any one of Examples 51 to 54 is disclosed, wherein the one or more switches include one or more transistors, and wherein controlling the one or more switches includes sending a control signal to control the one or more transistors to selectively connect the one or more of the plurality of antennas to, or disconnect the one or more of the plurality of antennas from, the common radiofrequency feed.

In Example 56, the one or more processors of any one of Examples 51 to 55 is disclosed, wherein the one or more switches include phototransistors, and wherein controlling the one or more switches includes sending a control signal to one or more light emitting elements to cause the one or more phototransistors to selectively connect the one or more of the plurality of antennas to, or disconnect the one or more of the plurality of antennas from, the common radiofrequency feed depending on the received light signal.

In Example 57, a means of antenna control is disclosed, including: a plurality of antenna means, each of the plurality of antenna means arranged to radiate in a unique directional pattern, away from a common axis; and one or more switching means, configured to selectively connect one or more of the plurality of antenna means to, or disconnect one or more of the plurality of antenna means from, a common radiofrequency feed.

In Example 58, the means of antenna control of Example 57 is disclosed, wherein the plurality of antenna means are configured to radiate essentially perpendicularly to the common axis.

In Example 59, the means of antenna control of Example 57 or 58 is disclosed, wherein the plurality of antenna means are slot antennas.

In Example 60, the means of antenna control of Example 59 is disclosed, wherein the plurality of slot antennas are each configured to radiate in a unidirectional pattern.

In Example 61, the means of antenna control of any one of Examples 57 to 60 is disclosed, further including: a shielding means, wherein the shielding means houses the antenna unit, and wherein the shielding means defines a generally hollow space adjacent to a top or bottom surface of the antenna unit.

In Example 62, the means of antenna control of Example 61 is disclosed, wherein the shielding means further includes a radiofrequency cable, connected to each of the plurality of antennas.

In Example 63, the means of antenna control of Example 61 or 62 is disclosed, wherein the shielding means includes metal.

In Example 64, the means of antenna control of any one of Examples 61 to 63 is disclosed, further including: a shielding means, including a side structure and a cover, wherein antenna unit is configured to be mounted in the shielding means such that at least a portion of the side structure is between the antenna unit and the cover.

In Example 65, the means of antenna control of any one of Examples 61 to 64 is disclosed, wherein the shielding means further includes a plurality of conducting means, configured to connect each of the plurality of antennas to a radiofrequency feed.

In Example 66, the means of antenna control of Example 65 is disclosed, wherein the plurality of conducting means are mounted in or on a surface of the housing.

In Example 67, the means of antenna control of Example 65 or 66 is disclosed, wherein the plurality of conducting means include microstrips.

In Example 68, the means of antenna control of any one of Examples 57 to 67 is disclosed, wherein the shielding means includes a plurality of separating means, configured to separate and shield the plurality of antennas from one another.

In Example 69, the means of antenna control of Example 68 is disclosed, wherein the plurality of separating means are metal.

In Example 70, the means of antenna control of Example 68 or 69 is disclosed, wherein the plurality of separating means are further configured to reduce coupling between adjacent antennas of the plurality of antennas.

In Example 71, the means of antenna control of any one of Examples 57 to 70 is disclosed, wherein the antenna unit includes one or more impedance matching means, configured to match an impedance of the one or more antennas and an impedance of a system to which the radiofrequency feed is connected.

In Example 72, the means of antenna control of any one of Examples 57 to 71 is disclosed, wherein the one or more switching means include one or more transistors, configured to selectively connect one or more of the plurality of antennas to, or disconnect one or more of the plurality of antennas from, a common radiofrequency feed depending on a control signal.

In Example 73, the means of antenna control of any one of Examples 57 to 72 is disclosed, further including: a controller, configured to send a control signal to control the one or more transistors.

In Example 74, the means of antenna control of any one of Examples 57 to 73 is disclosed, wherein the one or more switching means include one or more phototransistors, configured to receive a light signal and to selectively connect one or more of the plurality of antennas to, or disconnect one or more of the plurality of antennas from, the common radiofrequency feed depending on the received light signal.

In Example 75, the means of antenna control of Example 74 is disclosed, further including: a plurality of light emitting means and a controller, wherein the plurality of light emitting means are each configured to generate a light signal for one or the one or more phototransistors, and wherein the controller is configured to generate a control signal to control the one or more light emitting means.

In Example 76, the means of antenna control of any one of Examples 57 to 75 is disclosed, wherein the plurality of antennas are configured to approximate an omni-directional radiation pattern, when each of the plurality of antennas are connected to the common radiofrequency feed.

In Example 77, the means of antenna control of any one of Examples 57 to 76 is disclosed, wherein the antenna unit is configured to be part of an antenna-in-package.

In Example 78, the means of antenna control of any one of Examples 57 to 77 is disclosed, further including: a printed circuit board, connected to the antenna unit and the housing.

In Example 79, the means of antenna control of Example 78 is disclosed, wherein the printed circuit board includes one or more processors, configured to send a control signal to control the one or more switches to selectively connect one or more of the plurality of antennas to, or disconnect one or more of the plurality of antennas from, a common radiofrequency feed.

In Example 80, the means of antenna control of Example 78 or 79 is disclosed, wherein the printed circuit board includes one or more coaxial cable connectors.

In Example 81, the means of antenna control of any one of Examples 57 to 80 is disclosed, wherein antenna unit includes at least 5 antennas.

In Example 82, the means of antenna control of any one of Examples 57 to 91 is disclosed, wherein antenna unit includes at least 7 antennas.

In Example 83, one or more processors is disclosed, configured to select, based on first input data representing one or more beam shape attributes, one or more antenna arrays of a plurality of antenna arrays including a center antenna array and a plurality of outer antenna arrays arranged around the center antenna array, for excitation based on the received input data; and send a control signal, configured to control the selected one or more antenna arrays to radiate according to the one or more beam shape attributes.

In Example 84, the one or more processors of Example 83 are disclosed, wherein the one or more beam shape attributes include azimuthal beam directions.

In Example 85, the one or more processors of Example 83 or 84 are disclosed, wherein each of the plurality of antenna arrays is a circular antenna array including a plurality of antennas.

In Example 86, the one or more processors of any one of Examples 83 to 85 are disclosed, wherein the first input data include an upper bound and a lower bound for a beam shape.

In Example 87, the one or more processors of any one of Examples 83 to 86 are disclosed, wherein the first input data include a beam gain.

In Example 88, the one or more processors of any one of Examples 83 to 87 are disclosed, wherein the input data include one or more sidelobe constraints.

In Example 89, the one or more processors of any one of Examples 83 to 88 are disclosed, wherein the one or more processors are further configured to select, based on second input data representing a beam shape of the first input data and a beam direction different from a beam direction of the first input data, one or more antenna arrays of a plurality of antenna arrays including a center antenna array and a plurality of outer antenna arrays arranged around the center antenna array, for excitation based on the received input data.

In Example 90, a plurality of antenna arrays is disclosed, including: a center antenna array and plurality of outer antennas arrays arranged in circular formation around the center antenna array; and one or more processors, configured to select, based on first input data representing one or more beam shape attributes, one or more antenna arrays of the plurality of antenna arrays for excitation based on the received input data; and send a control signal, configured to control the selected one or more antenna arrays to radiate according to the one or more beam shape attributes.

In Example 91, the plurality of antenna arrays of Example 90 is disclosed, wherein the one or more beam shape attributes include azimuthal beam directions.

In Example 92, the plurality of antenna arrays of Example 90 or 91 is disclosed, wherein each of the plurality of antenna arrays is a circular antenna array including a plurality of antennas.

In Example 93, the plurality of antenna arrays of any one of Examples 90 to 92 is disclosed, wherein the first input data include an upper bound and a lower bound for a beam shape.

In Example 94, the plurality of antenna arrays of any one of Examples 90 to 93 is disclosed, wherein the first input data include a beam gain.

In Example 95, the plurality of antenna arrays of any one of Examples 90 to 94 is disclosed, wherein the input data include one or more sidelobe constraints.

In Example 96, the plurality of antenna arrays of any one of Examples 90 to 95 is disclosed, wherein the one or more processors are further configured to select, based on second input data representing a beam shape of the first input data and a beam direction different from a beam direction of the first input data, one or more antenna arrays of a plurality of antenna arrays including a center antenna array and a plurality of outer antenna arrays arranged around the center antenna array, for excitation based on the first input data and a directional modifier.

In Example 97, the plurality of antenna arrays of any one of Examples 90 to 96 is disclosed, wherein each antenna array of the plurality of antenna arrays is circular.

In Example 98, the plurality of antenna arrays of any one of Examples 90 to 97 is disclosed, the plurality of antennas arrays are arranged with equidistant spacing between each array.

In Example 99, a method of antenna array control is disclosed, including: selecting, based on first input data representing one or more beam shape attributes, one or more antenna arrays of a plurality of antenna arrays including a center antenna array and a plurality of outer antenna arrays arranged around the center antenna array, for excitation based on the received input data; and sending a control signal, configured to control the selected one or more antenna arrays to radiate according to the one or more beam shape attributes.

In Example 100, the method of antenna array control of Example 99 is disclosed, wherein the one or more beam shape attributes include azimuthal beam directions.

In Example 101, the method of antenna array control of Example 99 or 100 is disclosed, wherein each of the plurality of antenna arrays is a circular antenna array including a plurality of antennas.

In Example 102, the method of antenna array control of any one of Examples 99 to 101 is disclosed, wherein the first input data include an upper bound and a lower bound for a beam shape.

In Example 103, the method of antenna array control of Examples 99 to 102 is disclosed, wherein the first input data include a beam gain.

In Example 104, the method of antenna array control of Examples 99 to 103 is disclosed, wherein the input data include one or more sidelobe constraints.

In Example 105, the method of antenna array control of Examples 99 to 104 is disclosed, further including: selecting, based on second input data representing a beam shape of the first input data and a beam direction different from a beam direction of the first input data, one or more antenna arrays of a plurality of antenna arrays including a center antenna array and a plurality of outer antenna arrays arranged around the center antenna array, for excitation based on the first input data and a directional modifier.

In Example 106, the antenna unit of any one of Examples 1 to 24, wherein antenna unit includes at least 2 antennas.

In Example 107, the antenna unit of any one of Examples 1 to 24, wherein antenna unit includes at least 3 antennas.

In Example 108, the means of antenna control of any one of Examples 57 to 80 is disclosed, wherein antenna unit includes at least 2 antennas.

In Example 109, the means of antenna control of any one of Examples 57 to 91 is disclosed, wherein antenna unit includes at least 3 antennas.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. An antenna unit, comprising:

a plurality of slot antennas, each of the plurality of slot antennas arranged on a common plane around a common axis perpendicular to the common plane, to radiate in a unique directional pattern, away from the common axis, wherein the plurality of slot antennas are arranged in a circular manner on the common plane;

a housing, comprising a bottom surface and a side structure, wherein the housing houses the plurality of slot antennas, and wherein the housing defines a generally hollow space adjacent to a top or bottom surface of each of the plurality of slot antennas; and one or more switches, configured to selectively connect one or more of the plurality of slot antennas to, or disconnect one or more of the plurality of slot antennas from, a common radiofrequency feed.

2. The antenna unit of claim 1, wherein the plurality of slot antennas are configured to radiate perpendicularly to the common axis.

3. The antenna unit of claim 1, wherein the plurality of slot antennas are each configured to radiate in a unidirectional pattern.

4. The antenna unit of claim 1, wherein the housing further comprises a cover, wherein the plurality of slot antennas are configured to be mounted in the housing such that at least a portion of the side structure is between the plurality of slot antennas and the cover.

5. The antenna unit of claim 4, wherein the housing comprises a plurality of walls, substantially perpendicular to the plurality of slot antennas, wherein each of the plurality of walls is mounted between two of the plurality of slot antennas.

6. The antenna unit of claim 1, wherein the one or more switches comprise one or more transistors, configured to selectively connect one or more of the plurality of slot antennas to, or disconnect one or more of the plurality of slot antennas from, a common radiofrequency feed depending on a control signal.

7. The antenna unit of claim 1, wherein the one or more switches comprise one or more phototransistors, configured to receive a light signal and to selectively connect one or more of the plurality of slot antennas to, or disconnect one or more of the plurality of slot antennas from, the common radiofrequency feed depending on the received light signal.

8. The antenna unit of claim 7, further comprising:

a plurality of light emitting elements and a controller, wherein the plurality of light emitting elements are each configured to generate a light signal for one of the one or more phototransistors, and wherein the controller is configured to generate a control signal to control the one or more light emitting elements.

9. The antenna unit of claim 1, wherein the plurality of slot antennas are configured to approximate an omni-directional radiation pattern, when each of the plurality of slot antennas are connected to the common radiofrequency feed.

10. A method of antenna direction control, comprising:

controlling one or more switches to selectively connect one or more of a plurality of slot antennas to, or disconnect one or more of the plurality of slot antennas from, a common radiofrequency feed, wherein each of the plurality of slot antennas are arranged on a common plane around a common axis perpendicular to the common plane, to radiate in a unique directional pattern, away from the common axis; and wherein the plurality of slot antennas are arranged in a circular manner on the common plane, wherein the plurality of slot antennas are housed in a housing comprising a bottom surface and a side structure, wherein the housing defines a generally hollow space adjacent to a top or bottom surface of each of the plurality of slot antennas.

11. The method of antenna direction control of claim 10, wherein the one or more switches are one or more transistors, further comprising:

selectively connecting one or more of the plurality of slot antennas to, or disconnecting one or more of the plurality of slot antennas from, a common radiofrequency feed using the one or more transistors, depending on a control signal.

12. The method of antenna direction control of claim 10, wherein the one or more switches are one or more phototransistors, further comprising:

receiving one or more a light signals via the one or more phototransistors and selectively connecting one or more of the plurality of slot antennas to, or disconnecting one or more of the plurality of slot antennas from, the common radiofrequency feed depending on the received light signal using the one or more phototransistors.

13. The method of antenna direction control of claim 12, further comprising:

generating a light signal for one of the one or more phototransistors using one or more light emitting elements.

* * * * *